US012735364B1

(12) United States Patent
Chen et al.

(10) Patent No.: US 12,735,364 B1

(45) Date of Patent: Sep. 15, 2026

(54) PRODUCTION OF AEROGEL THERMAL INSULATION SHEET BY CENTRAL INJECTION APPROACH

(71) Applicant: Taiwan Aerogel Technology Material Co., Ltd., Tainan (TW)

(72) Inventors: Jean-Hong Chen, Tainan (TW); Cheng-Shu Chiang, Tainan (TW); Shiu-Shiu Chen, Tainan (TW); Ji-Hong Lo, Tainan (TW); Wen-Yen Hsu, Tainan (TW); Jun-Kai Chen, Tainan (TW); You-Wei Lin, Tainan (TW)

(73) Assignee: Taiwan Aerogel Technology Material Co., Ltd., Tainan (TW)

( * ) Notice: Subject to any disclaimer, the term of this patent is extended or adjusted under 35 U.S.C. 154(b) by 0 days.

(21) Appl. No.: 19/179,204

(22) Filed: Apr. 15, 2025

(51) Int. Cl.

| | |
|---|---|
| ***C04B 35/82*** | (2006.01) |
| ***C04B 35/624*** | (2006.01) |
| ***C04B 35/626*** | (2006.01) |
| ***C04B 35/628*** | (2006.01) |
| ***C04B 35/645*** | (2006.01) |
| ***C04B 35/80*** | (2006.01) |
| ***C04B 38/00*** | (2006.01) |

(52) U.S. Cl.

CPC ............ *C04B 35/82* (2013.01); *C04B 35/624* (2013.01); *C04B 35/62655* (2013.01); *C04B 35/62849* (2013.01); *C04B 35/62886* (2013.01); *C04B 35/645* (2013.01); *C04B 35/80* (2013.01); *C04B 38/0045* (2013.01); *C04B 2235/3418* (2013.01); *C04B 2235/5256* (2013.01); *C04B 2235/606* (2013.01); *C04B 2235/612* (2013.01); *C04B 2235/616* (2013.01); *C04B 2235/9607* (2013.01)

(58) Field of Classification Search

None

See application file for complete search history.

(56) References Cited

U.S. PATENT DOCUMENTS

| | | | | |
|---|---|---|---|---|
| 6,989,123 | B2 * | 1/2006 | Lee | F16L 59/026 264/308 |
| 7,078,359 | B2 * | 7/2006 | Stepanian | B32B 15/02 501/12 |
| 7,399,439 | B2 * | 7/2008 | Lee | B01J 13/0091 264/212 |

(Continued)

*Primary Examiner* — Michael P. Rodriguez

(74) *Attorney, Agent, or Firm* — troutman pepper locke; Tim Tingkang Xia, Esq.

(57) ABSTRACT

The present invention provides a method for producing aerogel thermal insulation sheet by central injection technique, comprising: (1) mixing and hydrolysis, (2) condensation and dispersion, (3) central injection, (4) drying and solvent recycling; a hydrolyzed aerogel solution is catalyzed by base and rapidly dispersed into a condensation dispersion solution, and then is rapidly injected into the interior of a roll-shaped or multi-layered fabric substrate from the inside out; a gelation is conducted after the fabric substrate is saturated of the condensation dispersion solution before subjected to a drying technique in combination with a solvent recycling technique; the entire process may further involve (5) hot-press and solvent recycling and (6) automated cutting so that the aerogel-fabric composite material stacked with a fabric blanket may be fixed by hot-press, and machined to be an aerogel thermal insulation sheet product with a flat and multi-layered structure.

10 Claims, 10 Drawing Sheets

(56) References Cited

U.S. PATENT DOCUMENTS

| | | | | |
|---|---|---|---|---|
| 7,780,890 | B2 * | 8/2010 | Lee | B29C 39/18<br>264/212 |
| 2005/0167891 | A1 * | 8/2005 | Lee | B29C 39/14<br>264/172.19 |
| 2018/0326700 | A1 * | 11/2018 | Kim | B32B 38/162 |
| 2018/0355551 | A1 * | 12/2018 | Kim | B05C 3/09 |
| 2023/0250020 | A1 * | 8/2023 | Zhang | C04B 14/4656<br>427/177 |
| 2023/0348284 | A1 * | 11/2023 | Chen | C01B 33/155 |

* cited by examiner

PRODUCTION OF AEROGEL THERMAL INSULATION SHEET BY CENTRAL INJECTION APPROACH

BACKGROUND OF THE INVENTION

1. Technical Field

The present invention relates to a central injection technique by which a fiber blanket can be rapidly filled with a sol solution by injecting the sol solution through a central injection tube or injection plate into the fiber blanket from the inside outward under a pressure difference, and which allows an aerogel thermal insulation sheet to be mass-produced in a continuous or semi-continuous manner. The invention aims to provide a central injection tube for use with a pressure difference-based injection technique in order to inject a sol solution into a fiber substrate rapidly from the inside outward, and by further stacking a fiber layer on the resulting composite material, products such as an aerogel thermal insulation blanket or aerogel thermal insulation sheet with a multilayer structure can be produced.

2. Description of Related Art

As is well known in the art, an aerogel is a porous material with a three-dimensional network structure, featuring a porosity higher than 80% (in some cases even higher than 95%), a low density (about 0.005-0.3 g/cm$^3$), a large specific surface area (500-2000 m$^2$/g), a low thermal conductivity (k=15-40 mW/mk), a low dielectric constant (Dk=1.3-2.0), and a low dissipation factor (Df<0.003). Therefore, aerogels or its composite materials containing an aerogel are innovative products with such extraordinary properties as being highly effective in thermal insulation, highly fireproof, and low in dielectric constant and dissipation factor. An aerogel or a composite material containing an aerogel has a high porosity, an extremely low density, and hence great value in applications requiring high thermal insulation performance, high fireproof performance, low signal transmission resistance, and high resistance to electrical impact; in other words, such materials have a strategic position in industries that entail resistance to high temperature or fire or that involve energy-saving and carbon-emission-reducing applications associated with high-power-consumption production equipment or delivery pipelines. Thanks to their low density (0.005-0.2 g/cm$^3$), aerogel materials, in particular silicon dioxide aerogels, are widely regarded as the best solid thermal insulation materials. This is because the large number of nanoscale to submicron pores, and the irregular silicon molecules stacked, in a silicon-based aerogel enable the aerogel to provide the lowest degree of thermal conduction (attributable to the low density and the sinuous thermal conduction pathways through the solid nanostructures), of thermal convection (attributable to the exceptionally small pore diameters, which limit convection to the greatest extent), and of thermal radiation (attributable to the high reflectivity (90% or above) of the densely distributed aerogel particles) and hence to function as a thermal insulator. Depending on its formula, a silicon-based aerogel may have a desirable thermal insulation effect in a harsh environment whose temperature is as high as 650° or above or is as low as −100° or below. To overcome the drawbacks of the physical properties of a pure aerogel (a pure aerogel can be so hard and brittle and have so weak an intermolecular interaction force that it cannot bend and tends to have powdery particles falling off), and to use silicon-based aerogels in the petrochemical field (which requires such an aerogel to bond with fiber to form a so-called aerogel thermal insulation blanket or aerogel fireproof/thermal insulation sheet) or in safety protection against the thermal runaway of lithium batteries, it is common practice nowadays to combine silicon-based aerogels with various fiber substrates, and the way in which silicon-based aerogel molecules bond to a fiber substrate is a key factor in the performance of the resulting aerogel composite material.

U.S. Pat. No. 6,989,123 B2, titled "METHODS TO PRODUCE GEL SHEETS," relates to various methods for producing gel sheets in a continuous manner and discloses various patented continuous or semi-continuous roll-to-roll casting-based aerogel manufacturing processes. According to the '123 patent, a roll-to-roll casting technique can be applied to different flexible fiber-reinforced substrates to help shorten the time required for industrial production of gel sheets.

U.S. Pat. No. 7,078,359 B2, titled "AEROGEL COMPOSITE WITH FIBROUS BATTING," relates to an aerogel composite material that has a large amount of fibrous batting-based reinforcing material, in particular a combination of fibrous batting and one or both of individual randomly oriented short microfibers and conductive layers. The '359 patent discloses a continuous and a semi-continuous roll-to-roll aerogel sol-gel casting technique, as well as injecting a predetermined amount of catalytic aerogel-sol into pre-fabricated rolled fiber batting that is co-rolled with a water-impermeable spacer layer.

U.S. Pat. No. 7,399,439 B2, titled "METHODS TO PRODUCE GEL SHEETS" and granted in 2008, relates to various methods for producing gel sheets in a continuous manner to help shorten the time required for industrial production of gel sheets. The '439 patent provides a process for continuously casting a solvent-filled gel sheet, and the process includes: providing at least a fibrous material; and forming a gel sheet by dispensing a catalyzed sol onto a moving element consisting essentially of one roll-to-roll moving conveyor belt, wherein the fibrous material is combined with the catalyzed sol prior to gelation.

U.S. Pat. No. 7,780,890 B2, titled "ADVANCED GEL SHEET PRODUCTION," relates to various methods for producing gel sheets in a continuous manner. The '890 patent provides a method for casting gel sheets, and the method includes the steps of: providing a reinforcing layer; providing a separator layer; combining the reinforcing layer and the separator layer to make a pre-form roll; infusing a sol into the pre-form roll; and gelling the sol in the pre-form roll to produce gel sheets. The '890 patent also discloses: introducing a water-impermeable layer into a fibrous batting material and rolling into a fiber-roll pre-form having a plurality of fibrous layers; infusing a certain quantity of sol into the fiber-roll pre-form; gelling the sol precursor in the fiber-roll pre-form; and removing the water-impermeable material to leave the gel material that remains.

The processing techniques of the afore-cited continuous roll-to-roll manufacturing processes have the following drawbacks: 1. The processing speeds of the continuous or semi-continuous roll-to-roll manufacturing processes are low to allow for the time required for gelation; 2. The equipment for continuous roll-to-roll production is structurally complicated, and the production equipment as a whole can be prohibitively costly; and 3. The techniques involved in the continuous roll-to-roll manufacturing processes are relatively difficult to control as a whole. In addition, the production techniques of injecting a predetermined amount of catalytic aerogel-sol and of co-rolling a water-impermeable spacer layer have the following disadvantages: 1. When a predetermined amount of catalytic aerogel-sol is injected into pre-fabricated rolled fiber batting under natural conditions, it is extremely difficult to fill the fiber completely with the aerogel-sol; and 2. As the viscosity of the liquid aerogel-sol increases with time, it is extremely difficult for the aerogel-sol to seep evenly into the roll-shaped or multilayer fiber.

BRIEF SUMMARY OF THE INVENTION

In view of the aforementioned drawbacks of the prior art, and based on the inventor's ample experience in aerogel production processes and techniques, the present invention provides a production technique that integrates a central injection bar or central injection plate with pressure difference-based injection in order to improve the drawbacks of the prior art. The invention involves injecting a sol solution through a central injection tube or a central injection plate into a fiber substrate under a vacuum condition and a pressure difference condition such that the sol solution enters the fiber substrate rapidly from the inside outward and/or in a downward direction and an upward direction and thereby fills the fiber substrate. When the sol solution enters a rolled fiber blanket from the inside outward, fills the fiber, and eventually flows out of the fiber substrate, it is ensured that all the pores in the fiber substrate are filled with the sol solution. Moreover, the sol solution ages and dries in the same tank. The preparation process of the invention may use multiple tanks that are moved through different production stages in a cyclic manner to speed up production. In addition, during the production process, the organic solvent in an aerogel blanket can be recycled while the aerogel blanket is being dried, and this helps reduce the production cost of an aerogel-fiber thermal insulation blanket or thermal insulation sheet.

The process of injecting a sol solution by the central injection approach of the present invention is carried out as follows. A central injection tube (also referred to herein as a central injection bar) is used to roll a fiber blanket into a rolled shape (i.e., to form a rolled fiber blanket), or a central injection plate is used to form a stack of multiple layers of sheet-like fiber blanket materials. The product thus formed is transferred into high-pressure injection equipment or vacuum injection equipment so that under a pressurized or vacuum condition, a sol solution can be injected through the central injection bar into the rolled fiber blanket from the inside outward or be injected through the central injection plate into the multiple layers of sheet-like fiber blanket materials from the inside outward. With the sol solution injected rapidly into the fiber blanket from the inside outward and/or in an upward direction and a downward direction, an aerogel blanket or thermal insulation sheet can be produced faster than by the prior art.

The present invention further provides different preparation methods. For example, the central injection bar is used for a rolled fiber blanket in an injection tank, and the central injection plate is used for a multilayer fiber blanket that is folded back and forth or for a multilayer sheet-like fiber blanket substrate. In either case, the injection of a sol solution is performed by the central injection approach, which allows the sol solution to be injected from the inside outward. This ensures that all the pores in the rolled fiber blanket or in the multilayer sheet-like fiber blanket will be occupied by the sol solution, and that the sol solution can be injected into the fiber blanket within a very short time, lest the sol solution, whose viscosity increases rapidly with time, have problem filling the fiber. Once the injection process is completed, the sol solution is allowed to age in the same injection tank and may be dried by an atmospheric-pressure high-temperature dry fluid or by azeotropic extraction with an ethanol-based or a carbon dioxide-based supercritical fluid in order to produce a dry aerogel-fiber thermal insulation blanket.

The present invention also provides different drying methods. For example, atmospheric-pressure high-temperature dry air may be injected into the central injection bar or the central injection plate in order to enter the injection tank, and carry out drying, from the inside outward and/or in the downward direction and the upward direction. As it is faster to dry an aerogel-fiber composite material from the inside outward than from the outside inward, the drying process in the invention provides a significant increase in the drying efficiency of a rolled aerogel-fiber composite material, of a multilayer back-and-forth folded aerogel-fiber composite material, or of a multilayer sheet-like aerogel-fiber composite material in comparison with the prior art, and this leads to an increase in yield.

Furthermore, after a rolled aerogel-fiber composite material or a multilayer sheet-like aerogel-fiber composite material is formed by injecting a sol solution into a rolled fiber blanket or a multilayer sheet-like fiber blanket respectively, the present invention allows the aerogel-fiber composite material to be pre-dried until semi-dry, then bonded to a fiber blanket, and then subjected to a hot-pressing process in order to form an aerogel-fiber composite sheet with a flat multilayer structure.

According to the present invention, a porous aerogel-fiber composite sheet may be prepared from a single fiber substrate or from two different blanket-like, mat-like, or sheet-like fiber substrates. The two different blanket-like, mat-like, or sheet-like fiber substrates may be an organic fiber substrate and an inorganic fiber substrate, or two fiber substrates whose fiber basis weights are markedly different, the objective being for the interface between the two fiber substrates that are different in composition or basis weight to serve as a spacer between the multiple layers of fiber, as explained below. An organic fiber substrate and an inorganic fiber substrate are different in hydrophilicity and hydrophobicity, and this gives rise to a significant repelling force between the two fiber substrates, meaning the two fiber substrates are not prone to adhere to each other. A marked difference in basis weight between two fiber substrates will keep these fiber substrates from adhering to each other, too. Therefore, two fiber substrates that are different in composition or basis weight can be coupled together to form a rolled two-phase fiber blanket, a two-phase multilayer back-and-forth folded fiber blanket, or a two-phase multilayer sheet-like fiber blanket, before a sol solution is injected into the fiber blanket from the center; and once the resulting two-phase fiber-aerogel composite structure ages, a striking force can be applied to split the rolled two-phase fiber blanket-aerogel composite structure, the two-phase multilayer back-and-forth folded fiber blanket-aerogel composite structure, or the two-phase multilayer sheet-like fiber blanket-aerogel composite structure, creating a gap in the two-phase fiber-aerogel composite structure, wherein the gap can serve as a channel through which the high-temperature gas or extraction fluid in the drying process can pass uniformly to increase the drying speed. When the two-phase fiber-aerogel composite structure is dry, two fiber-aerogel composite fireproof/thermal insulation materials (blanket-like or sheet-like) each having a different fiber are formed and can be rolled separately. The foregoing steps allow two aerogel-fiber composite thermal insulation sheets each having a different fiber substrate to be obtained at the same time such that production capacity is increased.

The process flow of the present invention is such that after aging, the two-phase fiber system will split because of the exceedingly low adhesion between the two phases, thereby providing a channel through which a high-temperature gas or extraction fluid can flow in a uniform manner to not only speed up drying and solvent recycling, but also allow two aerogel-fiber composite products each having a different fiber to be obtained simultaneously, thus increasing the yield of the intended aerogel thermal insulation sheets/blankets greatly.

Moreover, as the central injection process of the present invention entails injecting a sol solution from the inside outward and/or in the upward direction and the downward direction, the invention can be used to mass-produce an aerogel-fiber thermal insulation sheet/blanket/board of a sufficient length in a smaller production area than if a conventional continuous or semi-continuous injection process for batch production is used. More specifically, whether applied to the processing of a rolled fiber blanket substrate or a multilayer sheet-like fiber substrate, the central injection technique enables continuous and rapid production in a very small production space so that the time required to produce an aerogel-fiber thermal insulation sheet/blanket can be significantly shortened to increase mass-production capacity and reduce production cost.

Based on the aforesaid advantages, the present invention provides a preparation method that combines a central injection approach with a pressure difference in order to mass-produce an aerogel-fiber thermal insulation blanket or thermal insulation sheet. The preparation method includes: a mixing and hydrolysis step, a condensation and dispersion step, a central injection step, a drying and solvent recycling step, a hot-pressing and solvent recycling step, and an automatic cutting step.

The mixing and hydrolysis step: A siloxane precursor is added into an ethanol-based dispersion solvent to form a mixed solution, and then an acidic catalyst is added into the mixed solution in order for hydrolysis to take place. The siloxane precursor includes a hydrophobically modified siloxane compound whose original alkyl group is substituted by an alkyl group of a different alkyl chain length, a siloxane compound, or a combination of the above.

In the mixing and hydrolysis step, it is feasible for hydrolysis to take place while the siloxane compound or the hydrophobically modified siloxane compound whose original alkyl group is substituted by an alkyl group of a different alkyl chain length is being thoroughly mixed with a large amount of ethanol-based dispersion solvent containing a slight amount of acidic catalyst, or for hydrolysis to take place separately before mixing.

In the mixing and hydrolysis step for preparing a sol solution, the siloxane precursor may be selected not only from a siloxane compound and a hydrophobically modified siloxane compound whose original alkyl group is substituted by an alkyl group of a different alkyl chain length, but also from an inorganic material, an organic material, a composite material containing an inorganic material and an organic material, and a combination of the above.

The condensation and dispersion step: The mixed solution is added with an ethanol solution of a basic catalyst and stirred until thoroughly mixed in order for condensation to take place, producing a hydrolyzed mixed siloxane compound. After that, the mixed siloxane compound is added with an azeotropic dispersion solvent in a large amount and is added with an organic material or an inorganic material, before dispersion equipment such as an emulsifier or homogenizer is used to stir the resulting mixture at high speed to produce sol droplets that are suspended and dispersed. Thus, the mixed siloxane compound is dispersed in the azeotropic dispersion solvent in a large amount, forming a condensed dispersed sol solution, which in the next step will be rapidly injected into a rolled fiber blanket substrate or a multilayer sheet-like fiber substrate through a central injection tube or central injection plate that works in conjunction with a pressure difference.

The central injection step: The condensed dispersed sol solution creates a pressure difference between two sides of the fiber substrate. The pressure difference, which may be a vacuum pressure difference or a pump pressure difference, causes the condensed dispersed sol solution to seep rapidly from the central injection tube or central injection plate along the pressure decreasing direction of the pressure difference, i.e., to seep into the fiber substrate from the inside outward, such that an aerogel-fiber composite material is formed. The fiber substrate includes a rolled fiber blanket substrate or a multilayer sheet-like fiber substrate. The aerogel-fiber composite material includes a rolled aerogel-fiber wet-gel composite material or a multilayer sheet-like aerogel-fiber wet-gel composite material. When the central injection bar is used to inject the condensed dispersed sol solution rapidly into a rolled inorganic fiber substrate from the inside outward and/or in an upward direction and a downward direction, or when multiple central injection plates are used to inject the condensed dispersed sol solution into a multilayer sheet-like inorganic fiber substrate from the inside and from an upper and lower end, the condensed dispersed sol solution is injected rapidly into the rolled fiber blanket substrate or the multilayer sheet-like fiber substrate through the central injection bar or the central injection plates under a pressure difference condition such that a rolled aerogel-fiber wet-gel composite material or a multilayer sheet-like aerogel-fiber wet-gel composite material is formed.

For example, the pressure difference is created with an injection tank and the central injection tube or central injection plate provided in the injection tank, and the central injection step further includes one of the following: mounting the rolled fiber substrate around the central injection tube or stacking the rolled fiber substrate between two central injection plates in order for the condensed dispersed sol solution to be injected through the central injection tube or the two central injection plates into the fiber substrate from the inside outward or in the downward direction and the upward direction under a pressure difference that decreases from the central injection tube or the two central injection plates toward the tank wall of the injection tank; and placing the multilayer sheet-like fiber substrate on two opposite sides of a central injection plate or between two central injection plates in order for the condensed dispersed sol solution to be injected into the fiber substrate from the inside outward and in the downward direction and the upward direction under a pressure that decreases from the single central injection plate or the two central injection plates toward the tank wall of the injection tank.

In the central injection step, the fiber substrate may be an organic fiber and/or an inorganic fiber. More specifically, the fiber substrate includes an inorganic fiber, an organic fiber, or a composite material containing an inorganic fiber and an organic fiber, and is loose and flocculent, paper-like, mat-like, blanket-like, sheet-like, board-like, or in a form having a combination of the above attributes. After the condensed dispersed sol solution rapidly enters and fills a rolled fiber blanket substrate or a multilayer sheet-like organic fiber substrate by the central injection approach, a large amount of the suspended and dispersed sol droplets in the condensed dispersed sol solution, which sol droplets have nanoscale to submicron particle sizes (and include a mixture of hydrolyzed siloxane and hydrophobic siloxane), is gradually turned into nanoscale to submicron sol or wet-gel particles in the fiber substrate. The hydrophobic siloxane molecules in the suspended and dispersed sol droplets form stable three-dimensional wet-gel structures that have gelled inside the fiber and are interconnected, thereby forming a three-dimensional network gel structure.

The drying and solvent recycling step involves an atmospheric-pressure high-temperature drying technique or a supercritical drying technique and includes: making a high-temperature dry airflow or a supercritical fluid seep rapidly into the aerogel-fiber composite material from the central injection tube or the central injection plate(s) along the pressure decreasing direction such that the azeotropic dispersion solvent in the aerogel-fiber composite material, which has a stable structure, is rapidly vaporized and dried at a solvent recycling temperature. The solvent recycling temperature is between 60° C. and 180° C. or is at least 240° C.

For example, the atmospheric-pressure high-temperature drying technique includes a vaporization step, a solvent recycling step, and an expanding step.

The vaporization step: The aerogel-fiber composite material is placed in an environment at an azeotropic vaporization temperature such that a large amount of the azeotropic solvent in the structure of the aerogel-fiber composite material undergoes rapid azeotropic vaporization to facilitate distillation drying and recycling of the azeotropic solvent. The azeotropic vaporization temperature is 60° C. to 100° C.

The solvent recycling step: The solution vapor of the azeotropic solvent is guided into heat-exchanging recycling equipment, which condenses the azeotropic solvent and recycles the condensed solvent.

The expanding step: The azeotropic vaporization temperature is adjusted to an expanding temperature in order for the slight amount of azeotropic solvent and/or water molecules in the structure of the aerogel-fiber composite material to boil abruptly and generate a positive vapor pressure, thereby not only preventing the aerogel structure in the aerogel-fiber composite material from contracting upon drying, but also forming a large number of nanoscale to submicron pores, the objective being to produce an aerogel-fiber composite material having a relatively highly porous structure. The azeotropic vaporization temperature used in this step is 110° C. to 240° C.

The supercritical drying technique, on the other hand, includes a supercritical fluid impregnation step and a sublimation and solvent recycling step.

The supercritical fluid impregnation step: Once the rolled aerogel-fiber wet-gel composite material or the multilayer sheet-like aerogel-fiber wet-gel composite material has gelled and is allowed to stabilize structurally for a short time, a small amount of ethanol is added into the injection tank, e.g., until the liquid level resulting from the added ethanol is higher than the aerogel-fiber composite material. Then, the solvent recycling temperature and the pressure are gradually raised to 240.75° C. and to a supercritical pressure of 60.6 atm respectively (the supercritical point of carbon dioxide, on the other hand, corresponds to 31.10° C. and 72.9 atm), and the rolled aerogel-fiber wet-gel composite material or the multilayer sheet-like aerogel-fiber wet-gel composite material is impregnated in the supercritical fluid for a predetermined amount of time. When the system is stable, the high temperature and high pressure generated by the azeotropic dispersion solvent (e.g., ethanol) in the supercritical state cause a slow discharge of water and the azeotropic dispersion solvent (e.g., ethanol) into a large condensing tank, where the azeotropic dispersion solvent is condensed and recycled for use in preparing aerogel-fiber thermal insulation blankets of even higher quality.

For example, the drying and solvent recycling step further includes: injecting the high-temperature dry airflow or the supercritical fluid into the aerogel-fiber composite material from the inside outward and/or in the downward direction and the upward direction at a pressure that decreases from the central injection tube, the two central injection plates, or the single central injection plate toward the tank wall of the injection tank.

The hot-pressing and solvent recycling step: The aerogel-fiber composite material is hot-pressed by a high-temperature high-pressure hot press or is hot-pressed by the high-temperature high-pressure hot press after a fiber blanket-based protective layer is stacked on the aerogel-fiber composite material (or vice versa) or after the aerogel-fiber composite material is spray-coated with a high-temperature-resistant adhesive-based protective layer so as to form an aerogel-fiber composite fireproof/thermal insulation material having a single-layer, sandwiched, or multilayer structure, wherein the aerogel-fiber composite fireproof/thermal insulation material includes an aerogel-fiber composite thermal insulation blanket or an aerogel-fiber composite fireproof/thermal insulation sheet.

The automatic cutting step: Automatic cutting equipment is used to cut the aerogel-fiber composite fireproof/thermal insulation material into one or a plurality of aerogel-fiber thermal insulation sheets. More specifically, the aerogel-fiber composite thermal insulation blanket or aerogel-fiber composite fireproof/thermal insulation sheet obtained from the high-temperature high-pressure hot pressed is automatically cut to a fixed length or a fixed shape. Here, the aerogel-fiber composite fireproof/thermal insulation sheet is automatically cut to shape by a fixed-length cutting machine or a fixed-shape cutting machine, and the cut products are subsequently packed.

DETAILED DESCRIPTION OF THE INVENTION

Figure 1A:
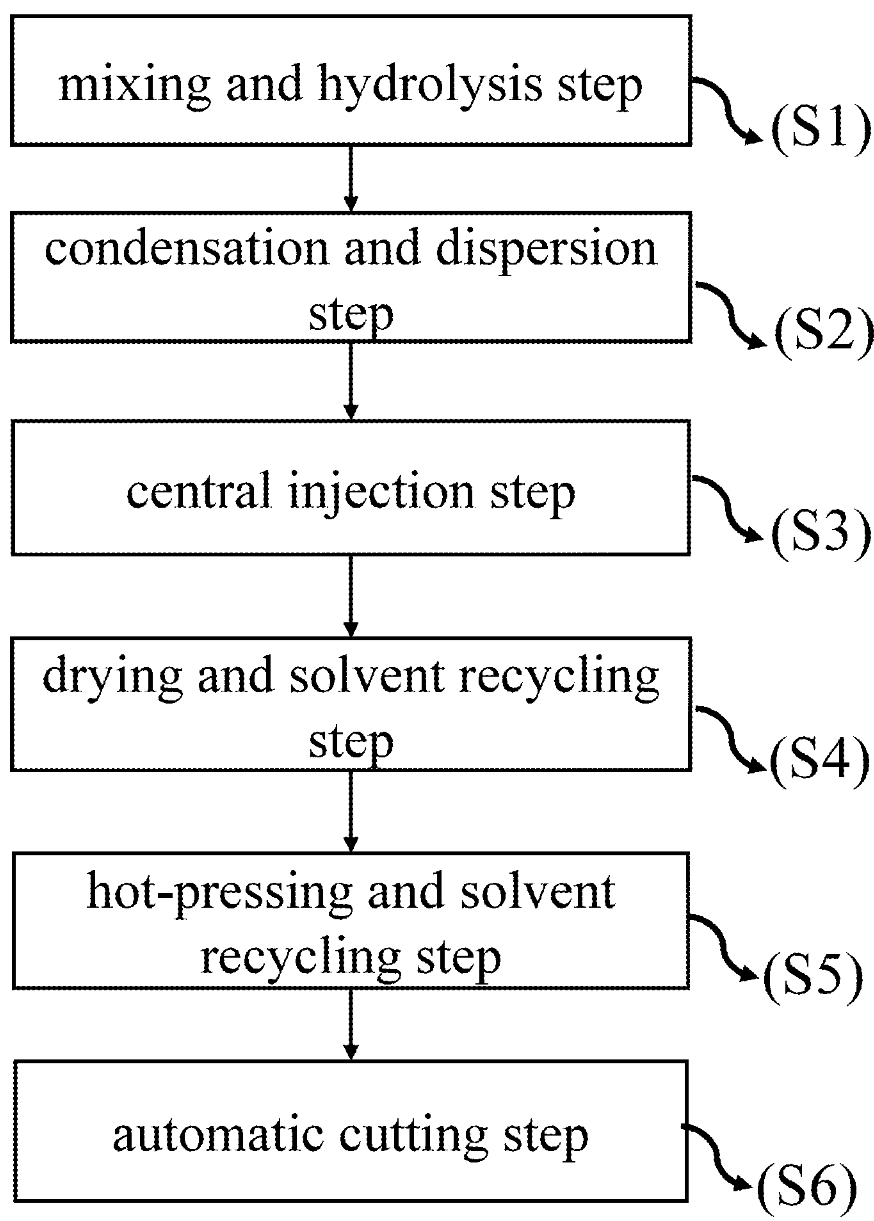
FIG. 1A to FIG. 1C are flowcharts explaining the preparation method provided by the present invention for mass-producing an aerogel-fiber thermal insulation sheet by a central injection approach.

Referring to FIG. 1A, the present invention provides a preparation method for mass-producing an aerogel-fiber thermal insulation sheet by a central injection approach, and the steps of the preparation method include: a mixing and hydrolysis step S1, a condensation and dispersion step S2, a central injection step S3, a drying and solvent recycling step S4, a hot-pressing and solvent recycling step S5, and an automatic cutting step S6.

The mixing and hydrolysis step S1 is performed as follows. A siloxane precursor is added into an ethanol-based dispersion solvent to form a mixed solution, wherein the siloxane precursor includes a hydrophobically modified siloxane compound whose original alkyl group is substituted by an alkyl group of a different alkyl chain length, a siloxane compound, or a combination of the above. After that, an acidic catalyst is added into the mixed solution in order for hydrolysis to take place. In some embodiments, the siloxane compound includes tetramethoxysilane (TMOS), tetraethoxysilane (TEOS), or a combination of both; and the hydrophobically modified siloxane compound whose original alkyl group is substituted by an alkyl group of a different alkyl chain length includes one or a combination of methyltrimethoxysilane (MTMS), propyltrimethoxysilane (PTMS), hexyltrimethoxysilane (HTMS), octyltrimethoxysilane (OTMS), and hexamethyldisilazane (HMDS). The purpose of adding the hydrophobically modified siloxane compound whose original alkyl group is substituted by an alkyl group of a different alkyl chain length is to reduce cracking of the resulting aerogel structure during the drying and solvent recycling process, and the purpose of adding the siloxane compound is to regulate the microstructures within the aerogel structure and thereby increase the number of pores in the aerogel structure. In some embodiments, with the mixed solution constituting 100 mol %, the total content of the siloxane compound and the hydrophobically modified siloxane compound whose original alkyl group is substituted by an alkyl group of a different alkyl chain length is between 5 mol % and 40 mol %, and the content of the ethanol-based dispersion solvent is between 95 mol % and 60 mol %.

In this embodiment, the siloxane compound and the hydrophobically modified siloxane compound whose original alkyl group is substituted by an alkyl group of a different alkyl chain length are in a mole ratio between 0:100 and 100:0, and in a preferred embodiment, the siloxane compound and the hydrophobically modified siloxane compound whose original alkyl group is substituted by an alkyl group of a different alkyl chain length are in a mole ratio of 20:80. In the ethanol-based dispersion solvent, the ethanol and water are in a mole ratio between 100:0 and 0:100, and in a preferred embodiment, the ethanol and water are in a mole ratio of 96:4.

In the mixing and hydrolysis step S1, hydrolysis takes place while the siloxane compound or the hydrophobically modified siloxane compound whose original alkyl group is substituted by an alkyl group of a different alkyl chain length is being thoroughly mixed with a large amount of ethanol-based dispersion solvent containing a slight amount of acidic catalyst, wherein the solvent part of the ethanol-based dispersion solvent containing an acidic catalyst includes one of, or a mixture with a variable composition between, ethanol, recycled ethanol, a recycled aqueous ethanol solution, and recycled water, and wherein the total siloxane precursor content and the acidic catalysis content are in a mole ratio between 1:0.1 and 1:0.0005. The higher the acidic catalyst content of the mixed solution, the faster the hydrolysis. In other words, an increase in the acidic catalyst content will cause an increase in the ion content of the aerogel structure and hence the dielectric loss of the aerogel. In a preferred embodiment, the total siloxane precursor content and the acidic catalyst content are in a mole ratio of 1:0.005.

The condensation and dispersion step S2 is performed as follows. The mixed solution is added with a basic catalyst in order for condensation to occur, thereby producing a hydrolyzed mixed siloxane compound. After that, the mixed siloxane compound is added with an azeotropic dispersion solvent, and the resulting mixture is stirred at high speed in order for the hydrolyzed mixed siloxane compound to form suspended and dispersed sol droplets, and for the suspended and dispersed sol droplets to be condensed in the azeotropic dispersion solvent such that a condensed dispersed sol solution is formed. More specifically, the basic catalyst is mixed into an ethanol solution, the azeotropic dispersion solvent contains ethanol and another organic solvent, and the condensed dispersed sol solution can be obtained by using such dispersion equipment as an emulsifier or homogenizer to stir at high speed, and thus disperse, the mixed siloxane compound having been mixed with the azeotropic dispersion solvent. The condensed dispersed sol solution obtained can then be rapidly injected into a fiber substrate through a central injection tube 21 or 38 in a vacuum environment. The condensed dispersed sol solution contains a large amount of suspended and dispersed submicron mixed droplets composed of hydrolyzed siloxane and hydrolyzed hydrophobic siloxane, in addition to a large amount of ethanol and the azeotropic dispersion solvent. The suspended and dispersed submicron mixed droplets composed of hydrolyzed siloxane and hydrolyzed hydrophobic siloxane will keep condensing in the dispersion solvent system until the micron-scale mixed droplets are gelled and condensed with one another to form a three-dimensional network gel structure.

The aforesaid organic solvent is one or more substances selected from the group consisting of: an alcohol, a ketone, an aromatic compound, and an alkane. For example, the organic solvent is one of, or a mixture with a variable composition between, propanol, isopropanol, acetone, cyclohexane, n-hexane, and toluene and can form a binary or ternary azeotropic mixed solvent with ethanol.

In the condensation and dispersion step S2, an increase in temperature helps shorten the time required for condensation so that the time required for the hydrolyzed aerogel droplets to transform into a condensed dispersed sol solution, i.e., the time required to gel the suspended and dispersed sol droplets, is effectively reduced. In addition, when the condensation and dispersion step S2 is performed in such a way that the equivalent weight ratio of the basic catalyst to the acidic catalyst is 1.0:1.0 and that the condensation temperature is raised from 20° C. to 55° C., the time required for condensation is shortened from about 250 minutes to about 20 minutes. In some preferred embodiments, the time required for condensation is about 35 minutes when the condensation temperature is 45° C.

Besides, in the condensation and dispersion step S2, an increase in the basic catalyst content can also bring about a significant reduction in the time required for condensation. When the equivalent weight ratio of a 1.0 N basic catalyst to a 1.0 N acidic catalyst is changed from 0.8:1.0 to 2.0:1.0, the time required for condensation is reduced from 360 minutes to about 5 minutes. In some preferred embodiments, the time required for condensation is about 30 minutes when the equivalent weight ratio of the 1.0 N basic catalyst to the 1.0 N acidic catalyst is 1.2:1.0. In this embodiment, the equivalent weight ratio is 1.2:1.0.

In the condensation and dispersion step S2, the preparation of the condensed dispersed sol solution and the solution of a high-temperature-resistant adhesive-based protective layer may include mixing with a material selected from the group consisting of an inorganic material, an organic material, and a composite material containing an inorganic material and organic material, wherein the inorganic material is one or a combination selected from the group consisting of water glass, silicon dioxide, alumina, magnesia, boron dioxide, silicon carbide, silicon nitride, titanium dioxide, calcium oxide, graphite powder, graphene, and amorphous carbon powder.

In some other embodiments, the organic material used in the condensation and dispersion step S2 to prepare the condensed dispersed sol solution and the solution of the high-temperature-resistant adhesive-based protective layer is one or a combination selected from the group consisting of an aromatic polyamide, an aromatic polyamide ester, an aromatic polyimide, an aromatic polyether imide, an aromatic polyphenyleneoxide, an aromatic polyphenylene sulfide, an aromatic polyetherketone, an polyamide, a polyester, polyethylene, polypropylene, a polyacrylate, polystyrene, polyacrylonitrile, a polyurethane, poly(tetrafluoroethylene), a resorcylaldehyde, a cresol-formaldehyde, a phenol-formaldehyde, polyvinyl alcohol, a high-temperature-resistant silicone, an organic high-temperature-resistant silicone, an organic silicon-modified epoxy, an organic silicon-modified polyurethane, an organic silicon-modified acrylate, and an organic silicon-modified polyvinyl alcohol.

The central injection step S3 is performed as follows. A pressure difference is created between two sides of a fiber substrate so that the condensed dispersed sol solution can enter the fiber substrate rapidly from the central injection tube 21 or a central injection plate 23 along the direction in which the pressure decreases and in a direction from an inner portion of the fiber substrate outward in order to form an aerogel-fiber composite material, wherein the fiber substrate includes a rolled fiber blanket substrate 22 or 32 or a multilayer sheet-like fiber substrate 42. More specifically, the condensed dispersed sol solution can be injected rapidly into the rolled fiber blanket substrate 22 or 32 or the multilayer sheet-like fiber substrate 42 by a central injection approach.

In the central injection step S3, referring to FIG. 2 and FIG. 3, the pressure difference includes a pump pressure or a vacuum pressure and is created with an injection tank 31 and the central injection tube 21 or central injection plates 23 provided in the injection tank 31, as detailed below.

(i) When the fiber substrate is the rolled fiber blanket substrate 22 or 32: The rolled fiber blanket substrate 22 or 32 is wound around the central injection tube 21 and/or between a top central injection plate 23 and a bottom central injection plate 23. The pressure or the pressure difference decreases from the central injection tube 21 or the two central injection plates 23 toward the tank wall of the injection tank 31 such that the condensed dispersed sol solution is injected rapidly into the rolled fiber blanket substrate 22 or 32 from the inside outward or in a downward direction and an upward direction.

(ii) When the fiber substrate is the multilayer sheet-like fiber substrate 42: The multilayer sheet-like fiber substrate 42 is provided on two opposite sides of a single central injection plate 43 or is provided between two central injection plates 43. The pressure decreases from the single central injection plate 43 or the two central injection plates 43 toward the opposing tank wall portions of the injection tank 41 such that the condensed dispersed sol solution is injected into the multilayer sheet-like fiber substrate 42 from the inside outward and in the downward direction and the upward direction.

More specifically, the fiber substrate is wound into the rolled fiber blanket substrate 22 or 32 using the central injection tube 21 and then fixed in the injection tank 31, or the multilayer sheet-like fiber substrate 42 is placed on two opposite sides of a single central injection plate 43 or provided between two central injection plates 43 as in a sandwiched structure and then fixed in the injection tank 41. After that, a pump pressure or vacuum pressure is delivered into the injection tank 31 or 41. When the vacuum level in the injection tank is at least lower than 0.6 atm, the air inside the fiber blanket or fiber sheets is removed by drawing air out of the injection tank, and then the condensed dispersed sol solution is injected into the central injection tube 21 or the central injection plates 23 or 43 from the bottom of the injection tank 31 or 41 by a compressor, in order for the condensed dispersed sol solution to be injected through the central injection tube 21 into the fiber substrate in the injection tank 31 or 41. Driven by the pressure difference caused by the creation of a vacuum, the condensed dispersed sol solution can be rapidly injected into the rolled fiber blanket substrate 22 or 32 or the multilayer sheet-like fiber substrate 42 from the inside outward or in the upward direction and the downward direction, i.e., along the pressure decreasing direction (e.g., the pressure is reduced from the central injection tube, which is the high-pressure end, toward the tank wall, which is the low-pressure end), to form an aerogel-fiber composite material, which includes a rolled gel-fiber composite material 71 or 81 or a multilayer sheet-like gel-fiber composite material 51 or 61.

When the fiber substrate in the central injection step S3 is an inorganic fiber, a large amount of the nanoscale to submicron mixed droplets composed of hydrolyzed siloxane and hydrolyzed hydrophobic siloxane will gradually transform into nanoscale to submicron wet-sol or wet-gel particles in the inorganic fiber substrate. During the process, the siloxane aerogel molecules in the wet-sol or wet-gel particles in the azeotropic dispersion solvent system bond preferentially to the inorganic fiber because the siloxane molecules in the hydrolyzed siloxane droplets contain a large amount of the hydrophobically modified siloxane compound whose original alkyl group is substituted by an alkyl group of a different alkyl chain length. The hydrophobically modified siloxane compound whose original alkyl group is substituted by an alkyl group of a different alkyl chain length further bonds to the siloxane aerogel molecules outside the inorganic fiber such that the mixture of the siloxane aerogel molecules outside the inorganic fiber and the hydrophobically modified siloxane compound gels in the azeotropic dispersion solvent and forms stable wet-gel structures that are interconnected, thus forming a three-dimensional network structure.

When the fiber substrate in the central injection step S3 is an organic fiber, and after the condensed dispersed sol solution rapidly enters and fills the rolled organic fiber substrate or multilayer sheet-like organic fiber substrate by the central injection approach under a pressure difference, a large amount of the nanoscale to submicron mixed droplets composed of hydrolyzed siloxane and hydrolyzed hydrophobic siloxane will gradually transform into nanoscale to submicron sol or wet-gel particles in the organic fiber substrate. During the process, the hydrophobic siloxane molecules in the mixed droplets composed of hydrolyzed siloxane and hydrolyzed hydrophobic siloxane bond preferentially to the surface of the organic fiber, and the siloxane aerogel molecules further bond to the hydrophobic siloxane aerogel molecules that are outside the organic fiber and have a different chain length. As a result, gel molecules that are inside the organic fiber and contain the siloxane compound and the hydrophobically modified siloxane compound in large amounts fill the organic fiber blanket and form a stable three-dimensional wet-gel structure that has gelled. In a room-temperature environment, the volume of the injected mixed solution (which contains the siloxane precursor) and the volume of the azeotropic dispersion solvent are in a ratio between 1.0:1.0 and 1.0 to 3.0. In some embodiments, the volume ratio is 1.0:1.0, and the gelation time is 30 minutes; or the volume ratio is 1.0:3.0, and the gelation time is 120 minutes. In some preferred embodiments, the volume ratio is 1.0:1.5, and the gelation time is shortened to 55 minutes, with the resulting three-dimensional network structure having a denser aerogel structure than those corresponding to other volume ratios.

In the central injection step S3, the fiber substrate may also be a combination of two types of fiber blanket substrates, such as an organic fiber substrate and an inorganic fiber substrate. In that case, a large amount of the nanoscale to submicron mixed droplets that are in the condensed dispersed sol solution and composed of hydrolyzed siloxane and hydrolyzed hydrophobic siloxane will gradually transform into a wet sol that has nanoscale to submicron particle sizes and lies in the two-phase substrate composed of organic fiber and inorganic fiber. As hydrolyzed hydrophilic siloxane tends to bond to the surface of inorganic fiber, and the hydrophobic siloxane molecules of the hydrolyzed hydrophobic siloxane in the mixed droplets bond preferentially to the surface of organic fiber, the siloxane molecules (e.g., TEOS) and hydrophobic siloxane molecules (e.g., MTMS) in the mixed droplets composed of hydrolyzed siloxane and hydrolyzed hydrophobic siloxane will coagulate arbitrarily between the organic fiber or between the inorganic fiber and form a three-dimensional network aerogel molecule-based structure. More specifically, siloxane molecules such as TEOS form four hydroxyl groups (—OH) after the hydrolysis, hydrophobic siloxane molecules such as MTMS form three hydroxyl groups (—OH) and one hydrophobic group (—$CH_3$) after the hydrolysis, and during the condensation process, bonding of the hydroxyl groups gives rise to dehydration and hence the formation of a net-like molecular structure. Under these conditions, the hydrophobically modified siloxane compound molecules and hydrophilic siloxane compound molecules in the two-phase fiber substrate stack on each other, forming mixtures of secondary hydrophilic siloxane aggregates and secondary hydrophobically modified siloxane compound aggregates. The mixtures further stack on one another such that a three-dimensional porous aerogel structure is formed. The differences in hydrophilicity and hydrophobicity between the organic fiber substrate and the inorganic fiber substrate result in a significant repelling force between the two fiber substrates; therefore, an externally applied striking force can easily cause a split that separates the hydrophilic fiber substrate from the hydrophobic fiber substrate or the high-basis-weight fiber substrate from the low-basis-weight fiber substrate.

The forgoing fiber substrates of two different compositions or two different basis weights can be used in combination to prepare a two-phase fiber substrate, which includes a rolled two-phase fiber blanket, a two-phase multilayer back-and-forth folded fiber blanket, or a two-phase multilayer sheet-like fiber blanket. After that, the mixing and hydrolysis step and the condensation and dispersion step are performed to prepare a sol solution, and then the central injection step is performed to form a two-phase fiber-aerogel composite material. Once the structure of the two-phase fiber-aerogel composite material has aged, the gap formed in the two-phase fiber-aerogel composite structure can serve as a channel that allows the high-temperature gas or extraction fluid in the subsequent drying and solvent recycling process to flow uniformly to further increase the speed of drying and solvent recycling. When the aerogel-fiber composite structure prepared from the rolled two-phase fiber blanket, from the two-phase multilayer back-and-forth folded fiber blanket, or from the two-phase multilayer sheet-like fiber blanket is dry, the resulting two different fiber-aerogel blankets or sheet-like products can be rolled separately. Thus, the aforesaid steps enable simultaneous obtainment of two aerogel-fiber composite thermal insulation blankets each made of a different fiber substrate or two aerogel-fiber composite thermal insulation sheets each made of a different fiber substrate.

According to the above, the present invention provides a manufacturing technique that uses a central injection approach to rapidly inject a condensed dispersed sol solution into a fiber blanket in order to form an aerogel thermal insulation blanket, wherein the fiber substrate includes an inorganic fiber, an organic fiber, or a combination of both. The inorganic fiber includes a glass fiber, a quartz fiber, a silicon dioxide fiber, an aluminum dioxide fiber, a magnesium dioxide fiber, a boron dioxide fiber, a silicon carbide fiber, a silicon nitride fiber, a carbon-based fiber, a ceramic fiber, a mineral wool fiber, a carbon-based pre-oxidized carbon fiber, or a degradable ceramic fiber, and can be rendered loose and flocculent, paper-like, mat-like, blanket-like, sheet-like, board-like, or into a form having a combination of the above attributes.

The organic fiber includes, for example, an aromatic polyamide fiber, an aromatic polyamide ester fiber, an aromatic polyimide fiber, an aromatic polyether imide fiber, an aromatic polyphenyleneoxide fiber, an aromatic polyphenylene sulfide fiber, an aromatic polyetherketone fiber, a polyamide fiber, a polyester fiber, a polyethylene fiber, a polypropylene fiber, a polystyrene fiber, a polyacrylonitrile fiber, a polyacrylonitrile pre-oxidized fiber, a poly(tetrafluoroethylene) fiber, a polyvinyl alcohol fiber, a high-temperature-resistant silicone fiber, an organic high-temperature-resistant silicone fiber, an organic silicon-modified epoxy fiber, an organic silicon-modified polyurethane fiber, an organic silicon-modified acrylate fiber, or an organic silicon-modified polyvinyl alcohol fiber, and can be rendered loose and flocculent, paper-like, mat-like, blanket-like, sheet-like, board-like, or into a form having a combination of the above attributes.

The drying and solvent recycling step S4 includes an atmospheric-pressure high-temperature drying and solvent recycling step S4*a* and/or a supercritical drying step S4*b*. More specifically, the drying and solvent recycling step S4 involves making a high-temperature dry airflow or a supercritical fluid seep rapidly into the aerogel-fiber composite material from the central injection tube and/or two central injection plates along the pressure decreasing direction such that the azeotropic dispersion solvent in the structurally stable aerogel-fiber composite material is vaporized and dried rapidly at a solvent recycling temperature, wherein the solvent recycling temperature is between 60° C. and 180° C. or is at least 240° C. More specifically, the high-temperature dry airflow or the supercritical fluid is injected into the aerogel-fiber composite material from the inside outward and/or in the downward direction and the upward direction under a pressure that decreases from the central injection tube 21 and/or the two central injection plates 23 or 43 toward the tank wall of the injection tank 31 or 41.

Figure 1B:
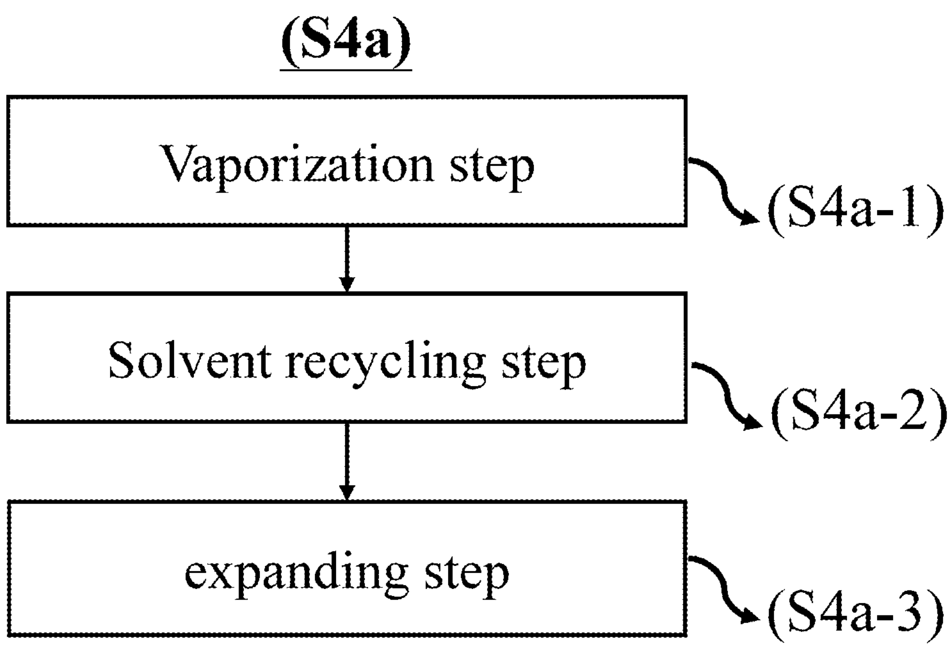

For example, referring to FIG. 1B, the atmospheric-pressure high-temperature drying and solvent recycling step S4*a* includes a vaporization step S4*a*-1 that is performed as follows. After the structurally stable rolled aerogel-fiber wet-gel composite material or multilayer sheet-like aerogel-fiber wet-gel composite material in the injection tank 31 or 41 is split, an atmospheric-pressure high-temperature dry airflow is coupled to a pipe coupled to the central injection tube 21 or to the bottom central injection plate 23 or 43 at the bottom of the injection tank 31 or 41 in order for the temperature of the composite material to rise from 60° C. to about 100° C. in a gradual stepwise manner, thereby causing azeotropic vaporization of the slight amounts of water, ethanol, and azeotropic dispersion solvent in the structurally stable rolled aerogel-fiber wet-gel composite material or multilayer sheet-like aerogel-fiber wet-gel composite material so that the azeotropic dispersion solvent can be recycled. By injecting the atmospheric-pressure high-temperature airflow rapidly into the structurally stable rolled aerogel-fiber wet-gel composite material or multilayer sheet-like aerogel-fiber wet-gel composite material through the central injection tube 21 or the bottom central injection plate 23 or 43, drying can be completed faster than by the prior art so as to obtain the rolled aerogel-fiber composite material 71 or 81 or the multilayer sheet-like aerogel-fiber composite material 51 or 61. Generally, the azeotropic vaporization temperature of the large amount of azeotropic solvent in the structure of the aerogel-fiber composite material is between 60° C. and 100° C., and in some preferred embodiments, the azeotropic vaporization temperature is between 68° C. and 85° C. in order for an aerogel-fiber composite material to be obtained at a relatively low temperature.

The drying and solvent recycling step S4 further includes a solvent recycling step S4*a*-2, and solvent recycling equipment can be designed to perform this step as follows. After the gel structure in the rolled aerogel-fiber wet-gel composite material or multilayer sheet-like aerogel-fiber wet-gel composite material is dried by the atmospheric-pressure high-temperature airflow, and the water, ethanol, and azeotropic solvent in the composite material go through azeotropic vaporization at a three-phase azeotropic temperature, the resulting azeotropic vapor is guided into condensing and recycling equipment. The condensing and recycling equipment condenses the water, ethanol, and azeotropic solvent and recycles the condensation product to reduce both cost and environmental pollution.

The drying and solvent recycling step S4 further includes an expanding step S4*a*-3 that is performed as follows. After most of the solvent in the rolled aerogel-fiber composite material or multilayer sheet-like aerogel-fiber composite material is vaporized, the azeotropic vaporization temperature is adjusted to a high temperature higher than the expanding temperature of the azeotropic solvent (i.e., to a temperature of at least 100° C.; the greater the temperature difference, the more notable the effect). When the azeotropic solvent remaining in the aerogel in the nearly dry rolled aerogel-fiber composite material or multilayer sheet-like aerogel-fiber composite material boils abruptly, the boiling azeotropic solvent generates a positive pressure that causes expansion within the aerogel structure in the rolled aerogel-fiber composite material or multilayer sheet-like aerogel-fiber composite material, and during the expansion, a large number of nanoscale to submicron pores are formed in the aerogel structure such that the resulting aerogel product is enhanced in porosity and its thermal insulation property. The expanding temperature is between 100° C. and 240° C., and in some preferred embodiments, the expanding temperature is between 130° C. and 150° C.

Figure 1C:
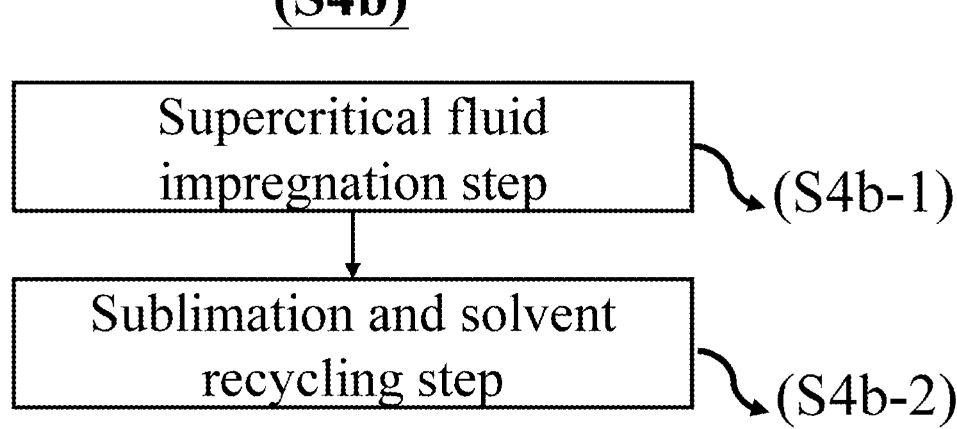

In some other embodiments, referring to FIG. 1C, the drying and solvent recycling step S4 is implemented by the supercritical drying step S4*b*, which includes performing drying and solvent recycling on an aerogel-fiber composite blanket or sheet by an ethanol-based supercritical drying technique or a carbon dioxide-based supercritical drying technique. The following paragraphs describe how the ethanol-based supercritical drying technique is carried out through, for example but not limited to, a supercritical fluid impregnation step S4*b*-1 and a sublimation and solvent recycling step S4*b*-2.

The ethanol-based supercritical fluid impregnation step S4*b*-1 in the supercritical drying step S4*b* is performed at a temperature and pressure higher than those corresponding to the critical point at which liquid ethanol and gaseous ethanol coexist. Generally, the supercritical point of ethanol is a condition in which the temperature and pressure of ethanol are 513.9 K (i.e., 240.75° C.) and 60.6 atm respectively (by contrast, the supercritical point of carbon dioxide is a condition in which the temperature and pressure of carbon dioxide are 304.25 K (i.e., 31.10° C.) and 72.9 atm respectively). When the temperature and pressure of ethanol are in the supercritical range, the interface between liquid ethanol and gaseous ethanol disappears, and in consequence, damage to the aerogel structure is minimized. Drying an aerogel-fiber composite material (e.g., a rolled, or multilayer sheet-like, gel-fiber thermal insulation blanket) by the ethanol-based supercritical drying technique not only can protect the integrity of the fragile aerogel structure, but also can create the largest number of nanoscale or micron-scale pores. In some embodiments, ethanol is used in the supercritical drying and solvent recycling step S4*b* because, with the structure of the rolled aerogel-fiber wet-gel composite material or multilayer sheet-like aerogel-fiber wet-gel composite material containing a large amount of ethanol molecules and a slight amount of water molecules, the use of ethanol eliminates the need to add another organic solvent for modification.

The supercritical fluid impregnation step S4*b*-1 in the supercritical drying step S4*b* is performed as follows. When the rolled aerogel-fiber wet-gel composite material or multilayer sheet-like aerogel-fiber wet-gel composite material has gelled and has been structurally stabilized for a short time, a small amount of ethanol is added into the injection tank 22 or 31 only until the liquid level in the injection tank is higher than the aerogel-fiber composite material. After that, the temperature and pressure in the injection tank are gradually increased to the solvent recycling temperature and the supercritical pressure respectively, and the aerogel-fiber composite material is impregnated in the supercritical fluid for at least 30 minutes, at least 60 minutes, or at least 90 minutes, wherein the solvent recycling temperature is 30° C. to 240° C. and the supercritical pressure is at least 60 atm to 70 atm. When ethanol is used as the supercritical fluid, the solvent recycling temperature is 240.75° C., the supercritical pressure is 60.6 atm, and the impregnation time under such a supercritical condition is about 1 hour. When carbon dioxide is used as the supercritical fluid instead, the solvent recycling temperature is 31.10° C., and the supercritical pressure is 72.9 atm.

The sublimation and solvent recycling step S4*b*-2 in the supercritical drying step S4*b* is carried out as follows. When the rolled aerogel-fiber wet-gel composite material or the multilayer sheet-like aerogel-fiber wet-gel composite material has been impregnated in the supercritical fluid for a predetermined period of time, and the supercritical system is stable, the valve leading to a large condensing tank is slightly opened in order for the water, ethanol, and azeotropic dispersion solvent in the composite material to be slowly discharged into the large condensing tank under the high temperature and high pressure of the supercritical ethanol, thereby allowing the azeotropic dispersion solvent to be condensed and recycled to complete the sublimation and solvent recycling step S4*b*-2. The drying and solvent recycling step S4 is performed under the same condition for two to three times. The ethanol-based supercritical drying technique can be used to prepare aerogel-fiber thermal insulation blankets of superior quality, but when ethanol is used as the supercritical fluid in the preparation of an aerogel in an organic system, it is important that the melting point of the organic system should not be lower than 240.75° C. When preparing an aerogel in a low-melting-point organic system, the drying and solvent recycling step S4 can be performed with carbon dioxide serving as the supercritical fluid.

The hot-pressing and solvent recycling step S5 is carried out as follows. If a rolled aerogel-fiber composite material or multilayer sheet-like aerogel-fiber composite material is to be made by a semi-continuous manufacturing process, the manufacturing process may use an additional high-temperature high-pressure hot press for hot-pressing the rolled aerogel-fiber composite material or multilayer sheet-like aerogel-fiber composite material in order to form a relatively flat aerogel-fiber composite fireproof/thermal insulation blanket or thermal insulation sheet. Alternatively, the hot-pressing process may be performed on a multilayer structure prepared by stacking a fiber blanket on the rolled aerogel-fiber composite material or multilayer sheet-like aerogel-fiber composite material, the objective being to form a gel-fiber composite fireproof/thermal insulation blanket or thermal insulation sheet having a flat multilayer structure. Or, a fiber substrate-based protective layer may be stacked on the aerogel-fiber composite material, or the aerogel-fiber composite material may be spray-coated with a high-temperature-resistant adhesive-based protective layer, before the stacked or spray-coated product is hot-pressed by the high-temperature high-pressure hot press. Thus, an aerogel-fiber composite fireproof/thermal insulation material having a single-layer, sandwiched, or multilayer structure can be formed.

As to the automatic cutting step S6, the dense aerogel-fiber composite thermal insulation blanket or aerogel-fiber composite fireproof/thermal insulation sheet having gone through hot-pressing and solvent recycling by the high-temperature high-pressure hot press can be automatically cut to a fixed length or a fixed shape in the automatic cutting step S6, which includes cutting the dense hot-pressed aerogel-fiber composite fireproof/thermal insulation material automatically with an automatic fixed-length cutting machine or fixed-shape cutting equipment so that the cut products are of the desired shape and ready for packing.

Figure 2:
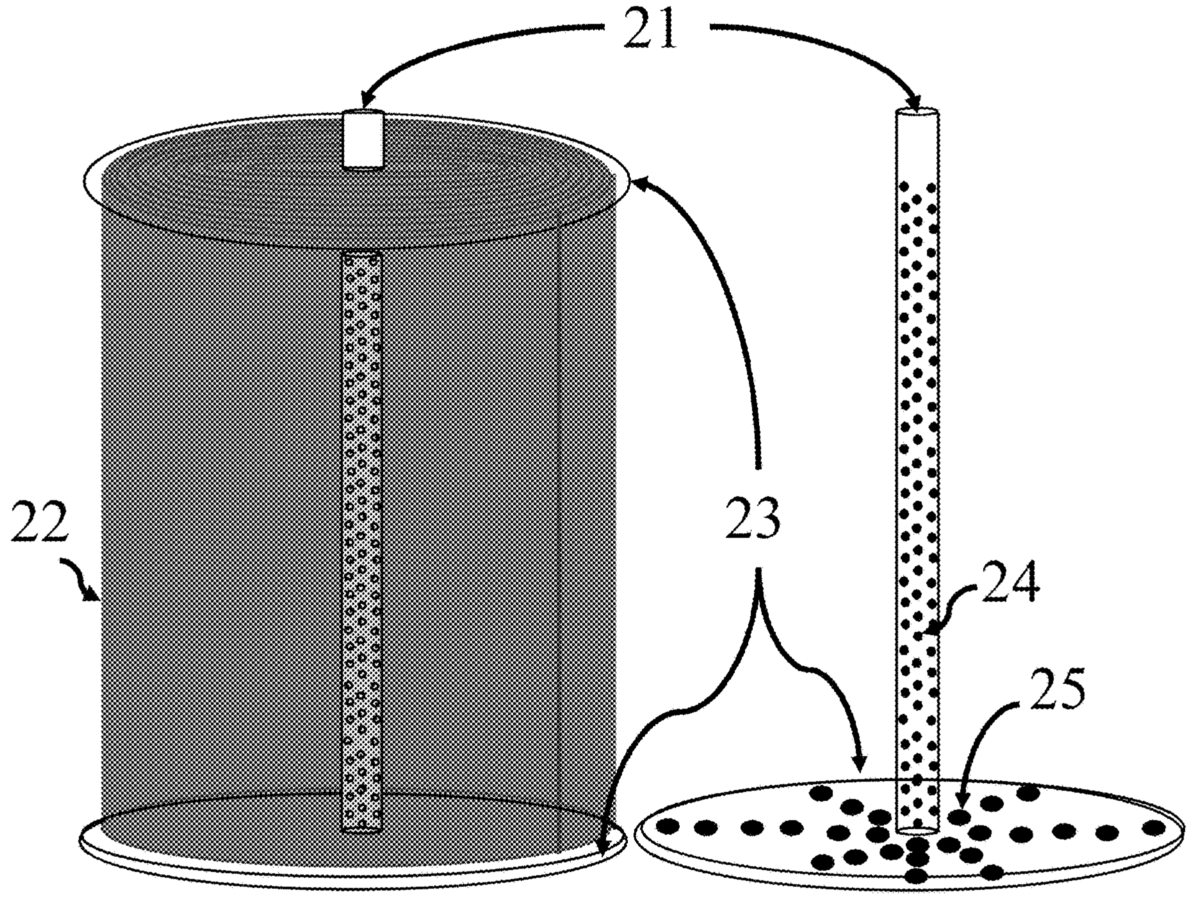
FIG. 2 shows a rolled fiber blanket substrate wound around a central injection tube.

FIG. 2 shows the rolled fiber blanket substrate 22 wound around the central injection tube 21. The reference numerals in FIG. 2 are explained as follows: 21 designates the central injection tube 21, to which an upper cover and a lower cover are fixed; 22 designates the rolled fiber blanket substrate 22, which is wound around the central injection tube; 23 designates the upper cover and lower cover, which are fixed to the central injection tube 21 and are the central injection plates 23; 24 corresponds to the black dots on the central injection tube 21, and the black dots represent first injection openings 24 for the condensed dispersed sol solution, the high-temperature dry airflow, or the supercritical fluid; and 25 corresponds to the black dots on the central injection plates 23, and these black dots represent second injection openings 25 for the condensed dispersed sol solution, the high-temperature dry airflow, or the supercritical fluid.

Figure 3:
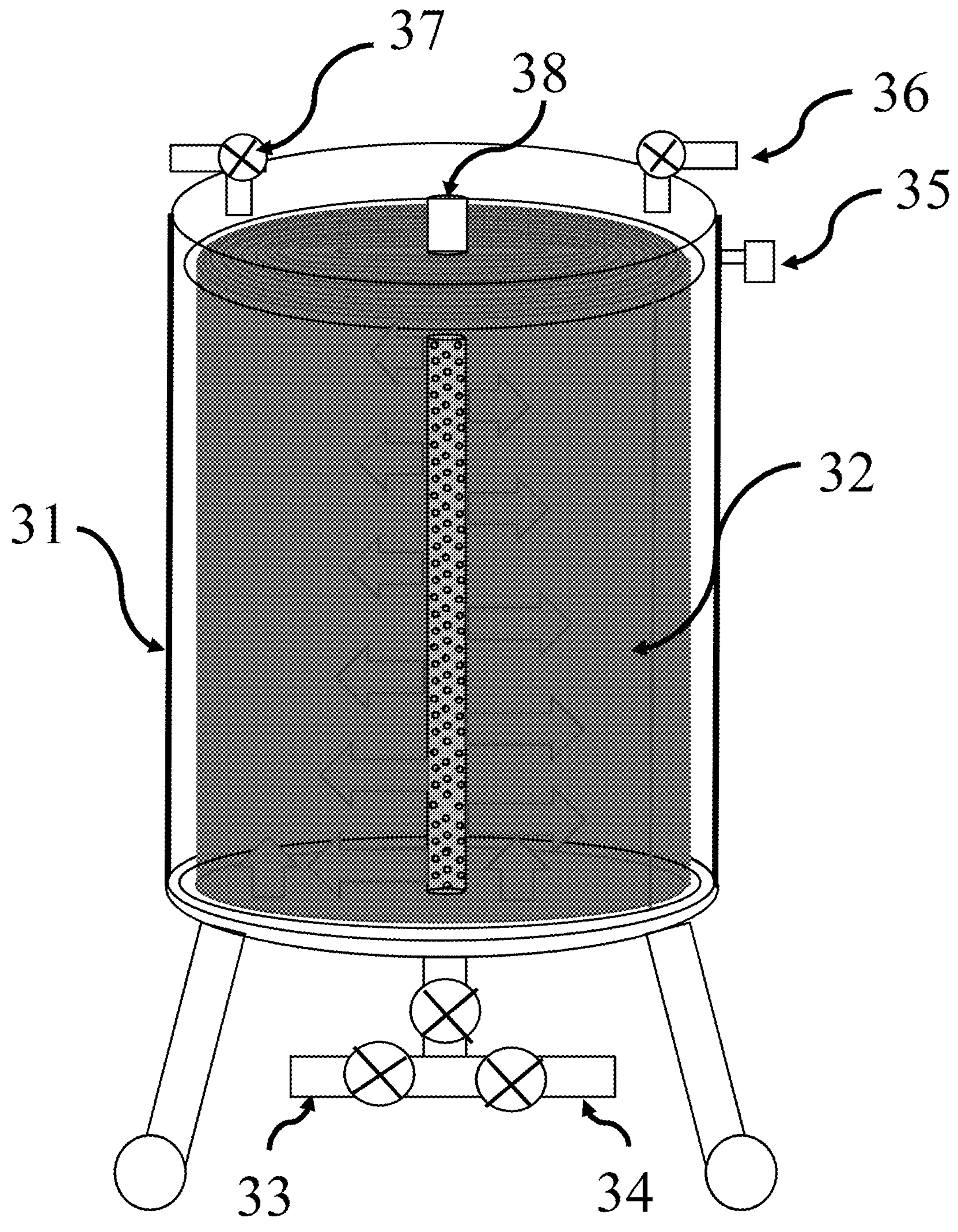
FIG. 3 shows how the preparation method works after the rolled fiber blanket substrate is put into an injection tank.

FIG. 3 shows how the preparation method of the present invention works after the rolled fiber blanket substrate 32 is put into the injection tank 31. In the injection tank 31, one or a combination of a high-pressure injection method and a vacuum injection method can be used to rapidly inject the condensed dispersed sol solution into the rolled fiber blanket substrate 32 from the inside outward and/or in the upward direction and the downward direction so that the rolled fiber blanket substrate 32 is impregnated with the condensed dispersed sol solution. The injection tank 31 can be transferred directly to other stages of the manufacturing process in order to perform such steps as aging and drying. In other words, without having to taking out the rolled fiber blanket substrate 32, the injection tank 31 can be transferred to subsequent stages of the manufacturing process along with the rolled fiber blanket substrate 32. In FIG. 3, the hollow arrows indicate the injection directions of the condensed dispersed sol solution, of the high-temperature dry airflow, or of the supercritical fluid, and the condensed dispersed sol solution, the high-temperature dry airflow, or the supercritical fluid enters the rolled fiber blanket substrate 32 through the first injection openings (not indicated in FIG. 3 by their reference numeral) and the second injection openings (not shown in FIG. 3). It can be understood that the high-temperature dry airflow or supercritical fluid can also be injected rapidly into the rolled fiber blanket substrate 32 from the inside outward and in the upward direction and the downward direction in order to form a rolled aerogel-fiber composite material. The foregoing injection directions allow sol injection and drying to be carried out with greatly enhanced efficiency. The reference numerals in FIG. 3 are explained as follows: 31 designates the injection tank 31; 32 designates the rolled fiber blanket substrate 32; 33 designates a first valve-mounted pipe 33 connected to the condensed dispersed sol solution; 34 designates a second valve-mounted pipe 34 connected to the high-temperature dry airflow or supercritical fluid; 35 designates a liquid level controller 35; 36 designates a third valve-mounted pipe 36 connected to a vacuum-creating machine; 37 designates a fourth valve-mounted pipe 37 connected to a condenser; and 38 designates the central injection tube 38.

Figure 4:
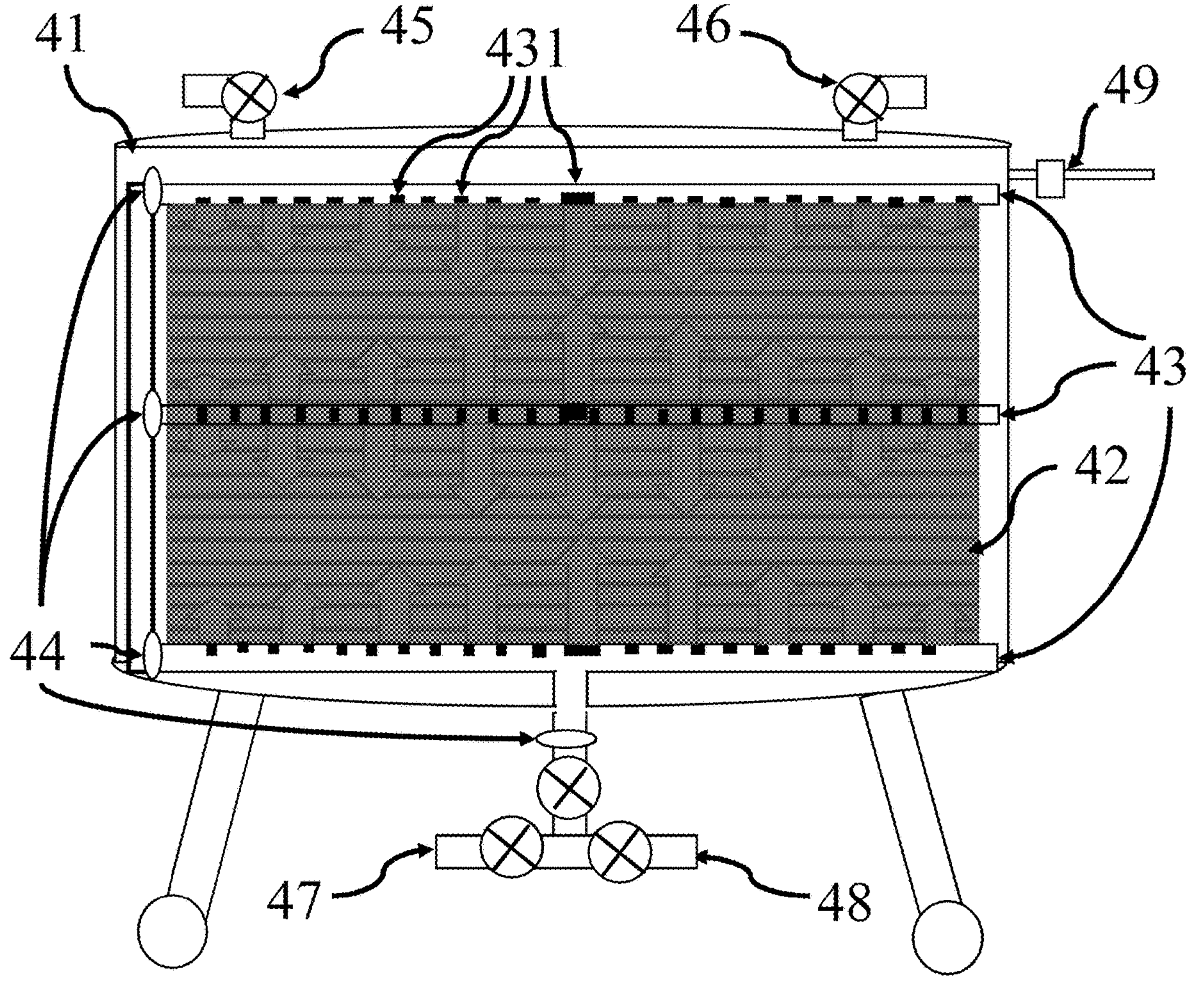
FIG. 4 shows how an injection tank for a multilayer sheet-like fiber substrate is used to carry out the central injection approach and an atmospheric-pressure high-temperature drying and solvent recycling step in order to prepare a multilayer sheet-like aerogel-fiber blanket.

FIG. 4 shows the injection tank 41 for the multilayer sheet-like fiber substrate 42. The injection tank 41 can be used to carry out central injection of the condensed dispersed sol solution in order to impregnate the multilayer sheet-like fiber substrate 42 with the condensed dispersed sol solution. Like the injection tank 31, the injection tank 41 can also be directly transferred to other stages of the manufacturing process in order to perform such steps as aging and dryings. The hollow arrows in FIG. 4 indicate the injection directions of the condensed dispersed sol solution, of the high-temperature dry airflow, or of the supercritical fluid. More specifically, each of the condensed dispersed sol solution, the high-temperature dry airflow, and the supercritical fluid is injected into the multilayer sheet-like fiber substrate from the inside outward and in the upward direction and the downward direction. The foregoing injection directions help raise the efficiency of sol injection and drying. The reference numerals in FIG. 4 are explained as follows: 41 designates the injection tank 41; 42 designates the multilayer sheet-like fiber substrate 42; 43 designates the central injection plates 43; 431 designates third injection openings 431 arranged in arrays in the central injection plates 43 and serving as channel openings through which the sol solution, the high-temperature dry airflow, or the supercritical fluid can be injected; 44 designates connecting valves 44 in communication with the central injection plates 43; 45 designates a fifth valve-mounted pipe 45 connected to a condenser; 46 designates a sixth valve-mounted pipe 46 connected to a vacuum-creating machine; 47 designates a seventh valve-mounted pipe 47 connected to the condensed dispersed sol solution; 48 designates an eighth valve-mounted pipe 48 connected to the high-temperature dry airflow or supercritical fluid; and 49 designates a liquid level controller 49.

Figure 5:
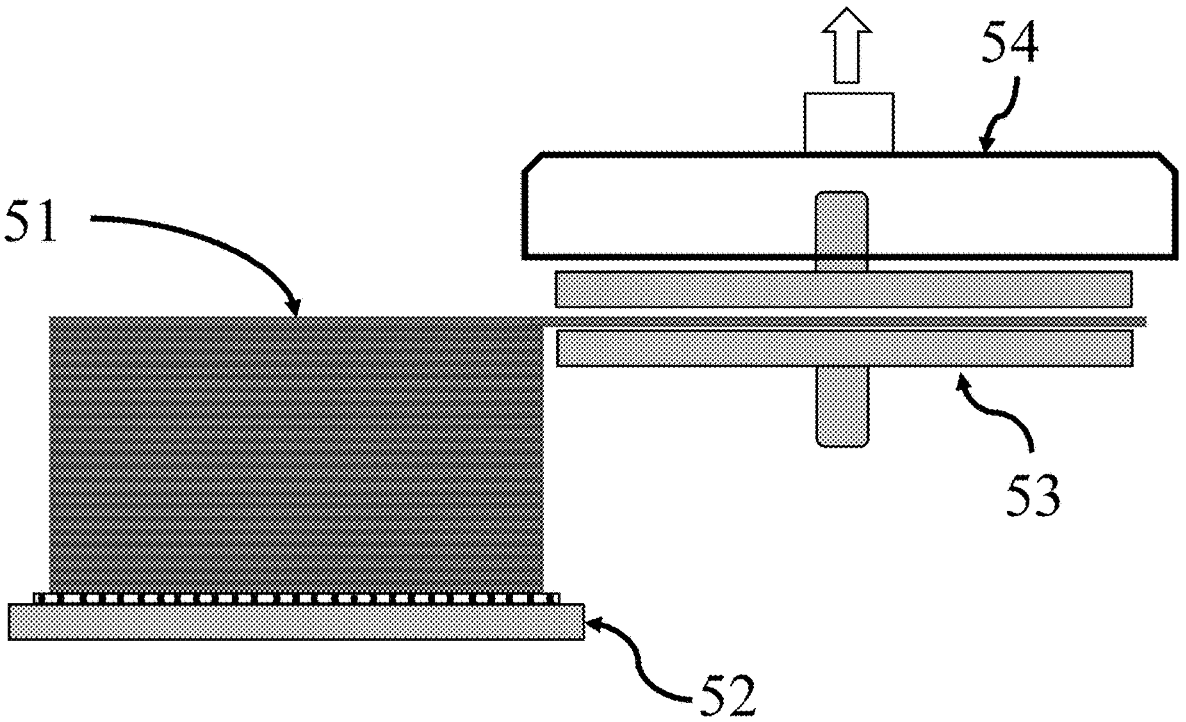
FIG. 5 shows how a multilayer sheet-like aerogel-fiber composite material formed by the central injection approach in conjunction with a drying and solvent recycling technique goes through a hot-pressing and solvent recycling process.

FIG. 5 shows how a multilayer sheet-like aerogel-fiber composite material formed by the central injection approach in conjunction with a drying and solvent recycling technique goes through a hot-pressing and solvent recycling process. As can be seen in the drawing, the aerogel-fiber composite material on which a fiber blanket-based protective layer has been stacked or which has been spray-coated with a high-temperature-resistant adhesive-based protective layer is subjected to the action of a hot press 53 such that the solvent remaining in the aerogel-fiber composite material 51 sublimes under a high temperature. Through the hot-pressing process, an aerogel-fiber thermal insulation sheet having a single-layer, sandwiched, or multilayer structure can be formed. The reference numerals in FIG. 5 are explained as follows: 51 designates the multilayer sheet-like aerogel-fiber composite material 51; 52 designates a lifting machine for the aerogel-fiber composite material; 53 designates the hot press 53; and 54 designates a solvent-recycling cover 54.

Figure 6:
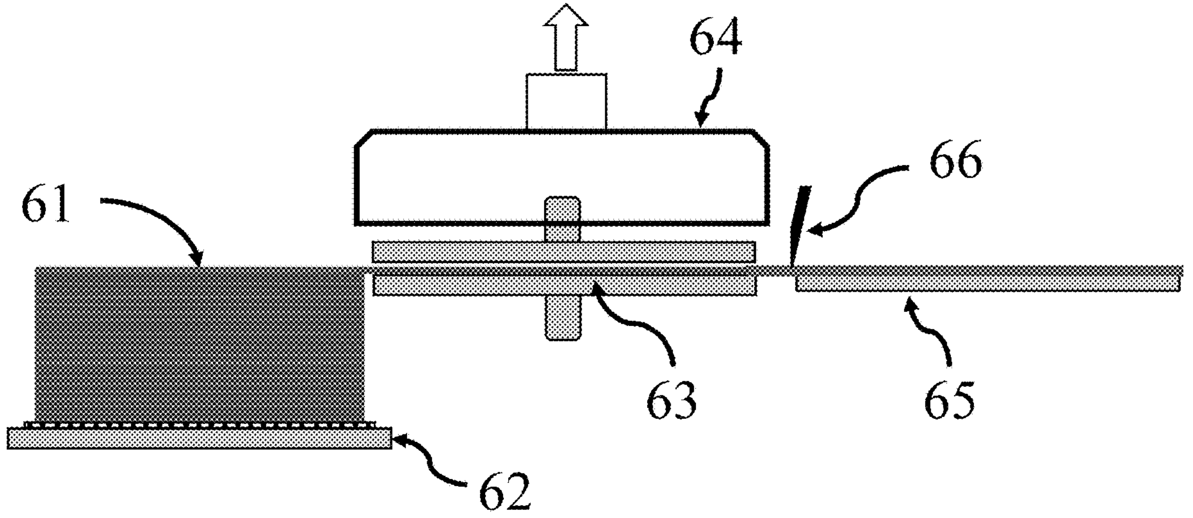
FIG. 6 shows how a multilayer sheet-like aerogel-fiber composite material formed by the central injection approach in conjunction with a drying and solvent recycling technique goes through a hot-pressing and solvent recycling process and an aerogel board cutting process.

FIG. 6 shows how a multilayer sheet-like aerogel-fiber composite material formed by the central injection approach in conjunction with a drying and solvent recycling technique goes through a hot-pressing and solvent recycling process and an aerogel board cutting process. The reference numerals in FIG. 6 are explained as follows: 61 designates the multilayer sheet-like aerogel-fiber composite material 61; 62 designates a lifting machine 62 for the aerogel-fiber composite material; 63 designates a hot press 63; 64 designates a solvent-recycling cover 64; 65 designates a length-controlling cutting platform 65; and 66 designates a cutting machine 66.

Figure 7:
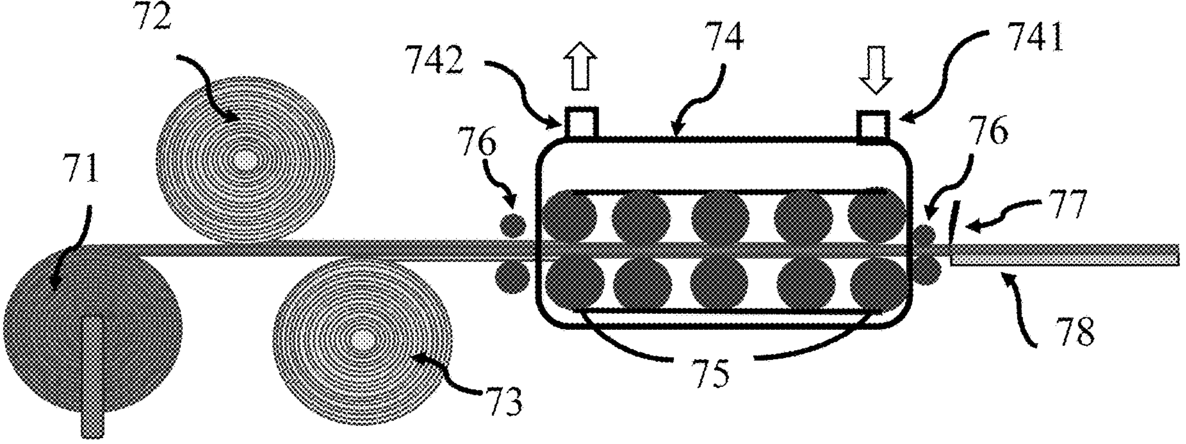
FIG. 7 shows how a rolled aerogel-fiber composite material formed by the central injection approach in conjunction with a drying and solvent recycling technique is bonded to protective layers and goes through a hot-pressing and solvent recycling process by multiple sets of hot-pressing and recycling rollers and an aerogel board cutting process.

FIG. 7 shows how a rolled aerogel-fiber composite material formed by the central injection approach in conjunction with a drying and solvent recycling technique goes through a hot-pressing and solvent recycling process by multiple sets of hot-pressing and recycling rollers and an aerogel board cutting process. The reference numerals in FIG. 7 are explained as follows: 71 designates the rolled aerogel-fiber composite material 71; 72 and 73 designate an upper protective layer 72 and a lower protective layer 73 for the rolled aerogel-fiber composite material 71 respectively, wherein the protective layers may be fiber substrate-based or high-temperature-resistant adhesive-based protective layers; 74 designates a high-temperature oven 74; 741 designates a high-temperature gas injection opening 741, and 742 designates a recycled solvent discharge opening 742, wherein the injection and discharge directions are indicated by the hollow arrows but are not limited to those indicated by the hollow arrows; 75 designates the multiple sets of hot-pressing rollers 75; 76 designates tensioning conveyer rollers 76; 77 designates a cutting machine 77; and 78 designates a length-controlling cutting platform 78.

Figure 8:
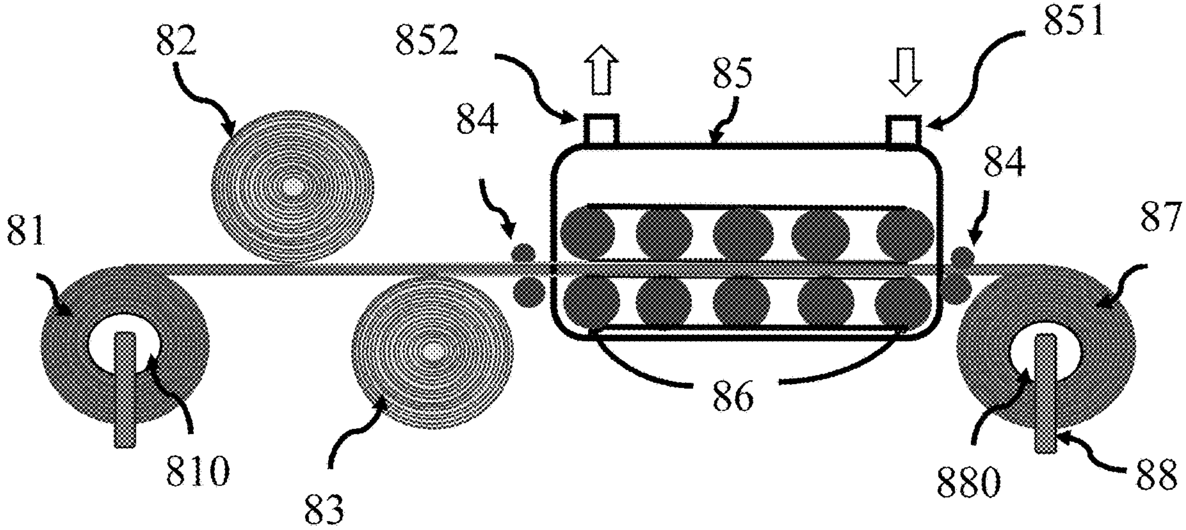
FIG. 8 shows how a rolled aerogel-fiber composite material formed by the central injection approach in conjunction with a drying and solvent recycling technique is bonded to protective layers and goes through a continuous roll-to-roll hot-pressing and solvent recycling process by hot-pressing and recycling rollers.

FIG. 8 shows how a rolled aerogel-fiber composite material formed by the central injection approach in conjunction with a drying and solvent recycling technique goes through a continuous roll-to-roll hot-pressing and solvent recycling process by hot-pressing and recycling rollers. The reference numerals in FIG. 8 are explained as follows: 81 designates the rolled aerogel-fiber composite material 81, which is wound around an unwinding reel 810; 82 and 83 designate an upper protective layer 82 and a lower protective layer 83 for the rolled aerogel-fiber composite material 81 respectively, wherein the protective layers may be fiber substrate-based or high-temperature-resistant adhesive-based protective layers; 84 designates tensioning conveyer rollers 84; 85 designates a high-temperature oven 85; 851 designates a high-temperature gas injection opening 851, and 852 designates a recycled solvent discharge opening 852, wherein the injection and discharge directions are indicated by the hollow arrows but are not limited to those indicated by the hollow arrows; 86 designates multiple sets of hot-pressing rollers 86; 87 designates a dry rolled aerogel-fiber composite material 87 wound around a winding reel 880; 88 designates a winding reel support 88 for the dry aerogel-fiber composite material 87; and 880 designates the winding reel 880, which is provided on the winding reel support 88. The manufacturing process shown in FIG. 8 can be used for continuous preparation of an aerogel composite material having a single-layer or multilayer structure.

Figure 9:
FIG. 9 shows a photo of aerogel-fiber composite fireproof/thermal insulation materials that were prepared according to the invention and have a sandwiched or multilayer structure.

FIG. 9 shows a photo of aerogel-fiber composite fireproof/thermal insulation materials that are prepared according to the present invention and have a single-layer, sandwiched, or multilayer structure. As the middle layer, the aerogel-fiber composite material can be changed in thickness according to practical needs. The outer protective layers may be fiber substrate-based or high-temperature-resistant adhesive-based protective layers, such as pre-oxidized fiber-based protective layers, which can bond tightly to the middle-layer aerogel-fiber composite material to prevent leakage of powdery aerogel particles from the middle layer, thereby overcoming the drawback of a conventional aluminum foil-covered or polyimide (PI) film-covered product, from which powdery aerogel particles may leak when the product is damaged upon bending or during use.

Embodiment 1

In tank A, 20% TEOS is evenly dispersed in an ethanol-based solvent and then added with a slight amount of aqueous acidic catalyst solution. After that, hydrolysis is allowed to take place for 8 hours at a pH value of 2 and a temperature of 45°. A silicon-oxygen compound hydrolysate solution is obtained as a result, and 50 L of this solution is introduced into the 400-L stainless-steel mixing tank of an emulsifier. In tank B, 20% MTMS is evenly dispersed in an ethanol-based solvent and then added with a slight amount of aqueous acidic catalyst solution. After that, hydrolysis is allowed to take place for 12 hours at a pH value of 2 and a temperature of 45°, and a methyl-group-containing silicon-oxygen compound hydrolysate solution is obtained as a result. 50 L of this solution is introduced into the 400-L stainless-steel mixing tank of the emulsifier and stirred at high speed in order to mix the methyl-group-containing silicon-oxygen compound hydrolysate solution into the silicon-oxygen compound hydrolysate solution rapidly. In addition, an azeotropic dispersion solvent is prepared in tank C by mixing ethanol and toluene with a slight amount of basic solution, and 100 L of the azeotropic dispersion solvent is introduced into the 400-L stainless-steel mixing tank of the emulsifier, where condensation and dispersion are carried out for 3 minutes. Then, referring to FIG. 3, multiple injection tanks are used to perform the central injection step S3 of the multi-stage manufacturing process of the present invention. To begin with, the first injection tank is used as follows. An inorganic fiber (e.g., a glass fiber, a pre-oxidized fiber, or a ceramic fiber) is wound around the central injection tube 38 to form a rolled fiber blanket substrate 32 and then secured with a metal net. The rolled fiber blanket substrate 32 plus the central injection tube 38 is then fixed in the stainless-steel injection tank 31. The bottom of the injection tank 31 is provided with the first valve-mounted pipe 33, which is connected to the condensed dispersed sol solution injection opening at the bottom and to a fluid pump and a flow meter, and the second valve-mounted pipe 34, which is connected to the high-temperature dry airflow injection opening at the bottom and to a fluid pump and a flow meter. Moreover, an upper portion of the injection tank 31 is provided with the third valve-mounted pipe 36, which is connected to a vacuum connecting pipe, a vacuum pump, and a flow meter, and the fourth valve-mounted pipe 37, which is connected to a pressure-relief condenser pipe. When a vacuum is created in the stainless-steel injection tank 31 such that the pressure in the injection tank 31 is lower than 0.6 atm, the first valve-mounted pipe 33 is opened to inject the condensed dispersed sol solution into the injection tank 31. In the vacuum environment, the condensed dispersed sol solution seeps through the central injection tube 38 into the rolled fiber blanket substrate 32 from the inside outward, and under the vacuum condition, the air in the pores in the rolled fiber blanket substrate 32 is removed by the vacuum, allowing the condensed dispersed sol solution, which is injected under compression, to seep rapidly into the rolled fiber blanket substrate 32 and fill the pores in the inorganic fiber substrate. When the condensed dispersed sol solution seeping into the inorganic fiber substrate fills the inorganic fiber substrate to such an extent that the liquid overflows into the return pipe of the liquid level controller 35 at the upper end of the injection tank 31, the inflow of the liquid triggers the liquid level controller 35 to output a signal for closing the third valve-mounted pipe 36, which is connected to the vacuum connecting pipe, and the first valve-mounted pipe 33, which is connected to the condensed dispersed sol solution injection opening, and for opening the fourth valve-mounted pipe 37, which is connected to a condenser, in order to release pressure from the injection tank 31. To perform the aging step of the multiple-tank multi-stage manufacturing process, the second valve-mounted pipe 34, which in this case is connected to a high-temperature dry airflow, is opened in order for the high-temperature dry airflow to increase the temperature in the injection tank 31 to 50° C. to 60° C., thereby enabling gelation to take place rapidly within the rolled fiber blanket substrate 32 impregnated with the condensed dispersed sol solution, and then aging was performed for 1 to 4 hours. During the aging process, the injection tank 31 is moved to the aging area, and the foregoing manufacturing process is repeated using another injection tank 31 so that rolled aerogel-inorganic fiber composite materials can be prepared continuously by the multiple-tank multi-stage manufacturing process. When the aging process corresponding to the first injection tank 31 is completed, the drying and solvent recycling step S4 of the multiple-tank multi-stage manufacturing process is performed by opening the second valve-mounted pipe 34 of the injection tank 31 (which pipe is still connected to the high-temperature dry airflow) in order for an atmospheric-pressure high-temperature dry airflow to be injected through the central injection tube 38 into the rolled aerogel-inorganic fiber composite material from the inside outward for drying. As the temperature in the injection tank 31 gradually increases from 60° C. to 150° C., the injected high-temperature dry airflow brings the temperature of the rolled aerogel-inorganic fiber composite material to the azeotropic temperature of the azeotropic solvent in the composite material, thereby allowing the solvent to be extracted and recycled, and during the process, the rolled aerogel-inorganic fiber composite material is gradually dried. It is worth mentioning that the drying and solvent recycling step S4 can be performed with the ethanol-based supercritical drying technique instead, and that with either drying technique, the resulting rolled aerogel-inorganic fiber composite material can be directly dried to form an aerogel-fiber thermal insulation blanket or aerogel-fiber thermal insulation sheet. Alternatively, as shown in FIG. 7, an inorganic fiber may be additionally stacked on each of the upper and lower sides of the rolled aerogel-inorganic fiber composite material in embodiment 1 before the resulting stack is fed through the multiple sets of hot-pressing rollers 75 and the high-temperature oven 74. Thus, the preparation of an aerogel-inorganic fiber thermal insulation blanket or aerogel-inorganic fiber thermal insulation sheet having a single-layer, sandwiched, or multilayer structure is made possible.

Embodiment 2

In tank A, 20% TEOS is hydrolyzed in ethanol and a slight amount of aqueous acidic catalyst solution for 6 hours at a pH value of 2 and a temperature of 45° C. A silicon-oxygen compound hydrolysate solution is obtained as a result, and 80 L of the silicon-oxygen compound hydrolysate solution is introduced into the 400-L stainless-steel mixing tank of an emulsifier. In tank B, a dispersion solution is prepared by mixing ethanol and water with a basic solution, and 40 L of the dispersion solution is introduced into the 400-L stainless-steel mixing tank of the emulsifier, where condensation and dispersion are carried out. Then, referring to FIG. 4, multiple injection tanks are used to perform the central injection step S3 of the multi-stage manufacturing process of the present invention. To begin with, the first injection tank is used as follows. An inorganic fiber (e.g., a glass fiber, a pre-oxidized fiber, or a ceramic fiber) is stacked in the stainless-steel injection tank 41 to form a multilayer sheet-like fiber substrate 42 that is sandwiched between an upper and lower porous central injection plate 43 along with a middle central injection plate 43. The bottom of the injection tank 41 is provided with the seventh valve-mounted pipe 47, which is connected to the condensed dispersed sol solution injection opening at the bottom and to a fluid pump and a flow meter, and the eighth valve-mounted pipe 48, which is connected to the supercritical fluid injection opening and to a fluid pump and a flow meter. Moreover, an upper portion of the injection tank 41 is provided with the sixth valve-mounted pipe 46, which is connected to a vacuum pump and a flow meter, and the fifth valve-mounted pipe 45, which is connected to a pressure-relief condenser pipe. When a vacuum is created in the stainless-steel injection tank 41 such that the pressure in the injection tank is lower than 0.6 atm, the seventh valve-mounted pipe 47 is opened to inject the condensed dispersed sol solution into the multilayer sheet-like fiber substrate 42 in the injection tank 41. In the vacuum environment, the condensed dispersed sol solution seeps rapidly through the central injection plates 43 into the multilayer sheet-like fiber substrate 42 from the inside outward, in the upward direction and in the downward direction, and under the vacuum condition, the air in the pores in the multilayer sheet-like fiber substrate 42 is removed, allowing the condensed dispersed sol solution to seep rapidly into the multilayer sheet-like fiber substrate 42 and fill the previously air-occupied pores in the inorganic fiber. When the condensed dispersed sol solution fills the fiber and flows into the return pipe of the liquid level controller 49 above the porous central injection plate 43 at the top, the inflow of the liquid triggers the liquid level controller 49 to output a signal for closing the sixth valve-mounted pipe 46 and the seventh valve-mounted pipe 47 and opening the fifth valve-mounted pipe 45, which is connected to a condenser, in order to release pressure and allow gelation to take place. To perform the aging step of the multiple-tank multi-stage manufacturing process, the eighth valve-mounted pipe 48, which in this step is connected to a high-temperature dry airflow, is opened in order for the high-temperature airflow to increase the temperature in the injection tank 41 to 50° C. to 60° C., thereby enabling gelation to take place rapidly within the multilayer sheet-like fiber substrate 42 impregnated with the condensed dispersed sol solution, and then aging is performed for 4 hours. During the aging process, the foregoing manufacturing process is repeated using another injection tank 41. When the aging process corresponding to the first injection tank 41 is completed, the drying and solvent recycling step S4 is performed by injecting a supercritical fluid through the eighth valve-mounted pipe 48 into the impregnated multilayer sheet-like aerogel-fiber composite material in the injection tank 41. The subsequently injected high-temperature supercritical fluid brings the temperature and pressure in the injection tank 41 to those corresponding to the supercritical state of ethanol or carbon dioxide, and the multilayer sheet-like aerogel-fiber composite material is kept in the supercritical environment for 1 hour, before the fifth valve-mounted pipe 45, which is connected to the condenser, is opened to discharge the azeotropic solvent along with the high-temperature high-pressure supercritical fluid. Thus, the multilayer sheet-like aerogel-fiber composite material is gradually dried while the solvent is recycled. It is worth mentioning that the drying and solvent recycling step can be performed with the atmospheric-pressure high-temperature drying and solvent recycling technique instead, and the general layout for this alternative process will be the same as shown in FIG. 4.

Embodiment 3

In tank A, 20% MTMS is evenly dispersed in an ethanol-based solvent and then added with a slight amount of aqueous acidic catalyst solution. After that, hydrolysis is allowed to take place for 6 hours at a pH value of 2 and a temperature of 45°. A methyl-group-containing silicon-oxygen compound hydrolysate solution is obtained as a result, and 100 L of this solution is introduced into the 400-L stainless-steel mixing tank of an emulsifier. Then, an azeotropic dispersion solvent is prepared in tank C by mixing ethanol, an azeotropic solvent, and a basic solution, and 20 L of the azeotropic dispersion solvent is introduced into the 400-L stainless-steel mixing tank of the emulsifier, where condensation and dispersion are carried out. Following that, referring to FIG. 4, the central injection step S3 is performed by stacking an organic fiber (e.g., a polypropylene (PP) melt-blown non-woven fabric, a polyester non-woven fabric, or an aromatic polyimide (PI) fiber) in the stainless-steel injection tank 41 to form a multilayer sheet-like fiber substrate 42 sandwiched between an upper and lower central injection plate 43 along with a middle central injection plate 43. The bottom of the injection tank 41 is provided with the seventh valve-mounted pipe 47, which is connected to the condensed dispersed sol solution injection opening at the bottom and to a fluid pump and a flow meter, and the eighth valve-mounted pipe 48, which is connected to the high-temperature dry airflow injection opening and to a fluid pump and a flow meter. Moreover, an upper portion of the injection tank 41 is provided with the sixth valve-mounted pipe 46, which is connected to a vacuum pump and a flow meter, and the fifth valve-mounted pipe 45, which is connected to a pressure-relief condenser pipe. When a vacuum is created in the stainless-steel injection tank 41 such that the pressure in the injection tank is lower than 0.6 atm, the seventh valve-mounted pipe 47 is opened to inject the condensed dispersed sol solution rapidly into the multilayer sheet-like fiber substrate 42. In the vacuum environment, the condensed dispersed sol solution seeps into the multilayer sheet-like fiber substrate 42 rapidly from the inside outward and in the upward direction and the downward direction. When the condensed dispersed sol solution seeping into the multilayer sheet-like fiber substrate 42 fills the fiber substrate to such an extent that the liquid flows into the liquid level controller 49 above the porous central injection plate at the top, the inflow of the liquid triggers the liquid level controller 49 to output a signal for closing the sixth valve-mounted pipe 46 and the seventh valve-mounted pipe 47 and opening the fifth valve-mounted pipe 45, which is connected to a condenser, in order to release pressure. To perform the aging step of the multiple-tank multi-stage manufacturing process, the eighth valve-mounted pipe 48, which in this case is connected to a high-temperature dry airflow, is opened in order for the high-temperature airflow to increase the temperature in the injection tank 41 to 50° C. to 60° C., thereby enabling gelation to take place rapidly within the multilayer sheet-like fiber substrate 42 impregnated with the condensed dispersed sol solution, and then aging is performed for 4 to 8 hours such that a multilayer sheet-like aerogel-organic fiber composite material is obtained. When the aging process is completed, the drying and solvent recycling step S4 is performed by injecting a high-temperature dry airflow through the eighth valve-mounted pipe 48 into the injection tank 41 again in order to raise the temperature in the injection tank 41 gradually from 60° C. to 120° C. The high-temperature dry airflow brings the temperature in the injection tank 41 to the azeotropic temperature of the azeotropic solvent in the multilayer sheet-like aerogel-organic fiber composite material, thereby allowing the azeotropic solvent to be extracted, and the multilayer sheet-like aerogel-organic fiber composite material is gradually dried while the solvent is recycled. It is worth mentioning that the drying and solvent recycling step S4 can be performed with the ethanol-based supercritical drying technique instead, that the general layout for this alternative process will be the same as shown in FIG. 4, and that with either drying technique, the resulting product can be directly dried to form an aerogel-organic fiber thermal insulation blanket or aerogel-organic fiber thermal insulation sheet. Alternatively, as shown in FIG. 5 and FIG. 6, the multilayer sheet-like aerogel-organic fiber composite material in embodiment 3 may be subsequently subjected to hot-pressing and solvent recycling by a hot-pressing and solvent recycling apparatus and then go through such processes as automatic cutting in order to prepare an aerogel-organic fiber thermal insulation sheet or aerogel-organic fiber thermal insulation film having a single-layer, sandwiched, or multilayer structure.

While the manufacturing method, use, and effects of the present invention have been clearly disclosed above, the embodiments disclosed herein are only some preferred ones of the invention and are not intended to be restrictive of the scope of the invention. Any equivalent change or modification that can be easily made according to the specification and the claims of the invention shall fall within the scope of the invention.

What is claimed is:

1. A preparation method for mass-producing an aerogel-fiber thermal insulation sheet by a central injection approach, the preparation method comprising:

a mixing and hydrolysis step in which: a siloxane precursor is added into an ethanol-based dispersion solvent to form a mixed solution, and an acidic catalyst is subsequently added into the mixed solution in order for hydrolysis to take place, wherein the siloxane precursor includes one or a combination of a hydrophobically modified siloxane compound whose original alkyl group is substituted by an alkyl group of a different alkyl chain length and a siloxane compound;

a condensation and dispersion step in which: the mixed solution is added with a basic catalyst in order for condensation to take place, thereby producing a hydrolyzed mixed siloxane compound, and the hydrolyzed mixed siloxane compound is subsequently added with an azeotropic dispersion solvent and added with an organic material or an inorganic material and is stirred at high speed in order for the hydrolyzed mixed siloxane compound to form suspended and dispersed sol droplets, and for the suspended and dispersed sol droplets to be condensed in the azeotropic dispersion solvent to form a condensed dispersed sol solution;

a central injection step in which: a pressure difference is created between two sides of a fiber substrate to allow the condensed dispersed sol solution to be rapidly injected through a central injection tube or a central injection plate into the fiber substrate from an inner portion thereof outward along a pressure decreasing direction of the pressure difference, thereby forming an aerogel-fiber composite material, wherein the pressure difference includes a pump pressure difference or a vacuum pressure difference, and wherein the fiber substrate includes a rolled fiber substrate or a multilayer sheet-like fiber substrate;

a drying and solvent recycling step in which: a high-temperature dry airflow or a supercritical fluid is made to spread rapidly from the central injection tube or the central injection plate along the pressure decreasing direction and thus into the aerogel-fiber composite material from an inner portion thereof outward such that the azeotropic dispersion solvent in the aerogel-fiber composite material, which has a stable structure, is rapidly vaporized and dried at a solvent recycling temperature, wherein the solvent recycling temperature is between 30° C. and 180° C. or is at least 240° C.;

a hot-pressing and solvent recycling step in which: the aerogel-fiber composite material is hot-pressed by a high-temperature high-pressure hot press or is hot-pressed by the high-temperature high-pressure hot press after the aerogel-fiber composite material and a fiber substrate-based protective layer are stacked up or after the aerogel-fiber composite material is spray-coated with a high-temperature-resistant adhesive-based protective layer, in order to form an aerogel-fiber composite fireproof/thermal insulation material having a single-layer, sandwiched, or multilayer structure; and an automatic cutting step in which: the aerogel-fiber composite fireproof/thermal insulation material is cut into one or a plurality of aerogel-fiber thermal insulation sheets by automatic cutting equipment.

2. The preparation method of claim 1, wherein the pressure difference is created with an injection tank and the central injection tube or the central injection plate provided in the injection tank, and the central injection step further includes:

having the rolled fiber substrate wound around the central injection tube or stacked between two said central injection plates so that, under a pressure decreasing from the central injection tube or the two central injection plates toward a tank wall of the injection tank, the condensed dispersed sol solution is injected into the fiber substrate from the inner portion thereof outward or in a downward direction and an upward direction; or providing the multilayer sheet-like fiber substrate on two opposite sides of a single said central injection plate or between two said central injection plates so that, under a pressure decreasing from the single central injection plate or the two central injection plates toward the tank wall of the injection tank, the condensed dispersed sol solution is injected into the fiber substrate from the inner portion thereof outward and in the downward direction and the upward direction;

wherein the drying and solvent recycling step further includes: injecting the high-temperature dry airflow or the supercritical fluid into the aerogel-fiber composite material from the inner portion outward and/or in the downward direction and the upward direction at a pressure decreasing from the central injection tube, the two central injection plates, or the single central injection plate toward the tank wall of the injection tank.

3. The preparation method of claim 2, wherein the injection tank is provided therein with one set, or at least two sets, of two said central injection plates, and as the number of said central injection plates increases, an injection time of the condensed dispersed sol solution or a drying time of the aerogel-fiber composite material is shortened.

4. The preparation method of claim 1, wherein the siloxane compound comprises one or a combination of tetramethoxysilane (TMOS) and tetraethoxysilane (TEOS); the hydrophobically modified siloxane compound whose original alkyl group is substituted by an alkyl group of a different alkyl chain length comprises one or a combination of methyltrimethoxysilane (MTMS), propyltrimethoxysilane (PTMS), hexyltrimethoxysilane (HTMS), octyltrimethoxysilane (OTMS), and hexamethyldisilazane (HMDS); and with the mixed solution constituting 100 mol %, the siloxane compound and the hydrophobically modified siloxane compound whose original alkyl group is substituted by an alkyl group of a different alkyl chain length are in a mole ratio between 0 mol %: 100 mol % and 95 mol %:5.0 mol %.

5. The preparation method of claim 1, wherein the azeotropic dispersion solvent is a binary or ternary azeotropic mixed solvent including water, ethanol, and another organic solvent, and said another organic solvent includes one or more selected from the group consisting of: an alcohol selected from the group consisting of propanol and isopropanol, a ketone selected from the group consisting of acetone, a alkane selected from the group consisting of cyclohexane and n-hexane, and an aromatic compound selected from the group consisting of toluene.

6. The preparation method of claim 1, wherein the fiber substrate is composed of one or a combination of an inorganic fiber and an organic fiber and is loose and flocculent, paper-like, mat-like, blanket-like, sheet-like, or board-like.

7. The preparation method of claim 1, wherein the fiber substrate comprises a multilayer single-phase inorganic fiber substrate, a multilayer single-phase organic fiber substrate, or a multilayer two-phase fiber substrate formed of the single-phase inorganic fiber substrate and the single-phase organic fiber substrate.

8. The preparation method of claim 1, wherein when performed with the high-temperature dry airflow, the drying and solvent recycling step comprises:

a vaporization step in which: the aerogel-fiber composite material is placed in an environment at an azeotropic vaporization temperature such that a large amount of the azeotropic dispersion solvent in the structure of the aerogel-fiber composite material undergoes rapid azeotropic vaporization to facilitate distillation drying and recycling of the azeotropic dispersion solvent, wherein the azeotropic vaporization temperature is 60° C. to 100° C.;

a solvent recycling step in which: a solution vapor of the azeotropic dispersion solvent is guided into heat-exchanging recycling equipment in order for the heat-exchanging recycling equipment to condense the azeotropic dispersion solvent and recycle a condensed azeotropic dispersion solvent; and a expanding step in which: the azeotropic vaporization temperature is adjusted to an expanding temperature in order for a slight amount of the azeotropic dispersion solvent and/or water molecules in the structure of the aerogel-fiber composite material to boil abruptly and generate a positive vapor pressure, thereby not only preventing an aerogel structure in the aerogel-fiber composite material from contracting upon drying, but also forming a large number of nanoscale to submicron pores in, and thus increasing porosity of, the aerogel-fiber composite material, wherein the azeotropic vaporization temperature used in the expanding step is 110° C. to 240° C.

9. The preparation method of claim 1, wherein when performed with the supercritical fluid, the drying and solvent recycling step comprises:

a supercritical fluid impregnation step in which: a supercritical pressure is achieved at the solvent recycling temperature, and the aerogel-fiber composite material is impregnated in the supercritical fluid for at least 30 minutes, at least 60 minutes, or at least 90 minutes, wherein the solvent recycling temperature is at least 30° C. to 240° C., and wherein the supercritical pressure is at least 60 atm to 70 atm; and a sublimation and solvent recycling step in which: due to a high temperature and a high pressure generated by the azeotropic dispersion solvent, the azeotropic dispersion solvent is gradually discharged into a large condensing tank in order to be condensed and recycled.

10. The preparation method of claim 1, wherein the condensed dispersed sol solution and a solution of the high-temperature-resistant adhesive-based protective layer include an inorganic material, an organic material, or a composite material containing an inorganic material and an organic material.

* * * * *